US009492959B2

(12) United States Patent
Todesco et al.

(10) Patent No.: US 9,492,959 B2
(45) Date of Patent: Nov. 15, 2016

(54) SELF-BALANCING HOT RUNNER WITH INDEPENDENT FLOW AND PRESSURE CONTROL

(71) Applicant: Meiban International Pte. Ltd., Singapore (SG)

(72) Inventors: Pierre Louis Todesco, Singapore (SG); Carol Su Lin Goh, Singapore (SG); John Chee Beng Lim, Singapore (SG)

(73) Assignee: Meiban International Pte. Ltd., Singapore (SG)

( * ) Notice: Subject to any disclaimer, the term of this patent is extended or adjusted under 35 U.S.C. 154(b) by 743 days.

(21) Appl. No.: 13/845,613

(22) Filed: Mar. 18, 2013

(65) Prior Publication Data

US 2013/0266680 A1   Oct. 10, 2013

Related U.S. Application Data

(63) Continuation of application No. PCT/SG2012/000307, filed on Aug. 31, 2012.

(30) Foreign Application Priority Data

Mar. 23, 2012  (GB) .................................. 1205091.0

(51) Int. Cl.
*B29C 45/13* (2006.01)
*B29C 45/23* (2006.01)
*B29C 45/32* (2006.01)

(52) U.S. Cl.
CPC ............. *B29C 45/23* (2013.01); *B29C 45/322* (2013.01)

(58) Field of Classification Search
CPC ............................ B29C 45/23; B29C 45/322
USPC .............. 425/562–566, 557, 264; 264/328.1, 264/328.9
See application file for complete search history.

(56) References Cited

U.S. PATENT DOCUMENTS 3,553,788 A * 1/1971 Putkowski .............. B29C 45/27
                                                              425/192 R
3,912,133 A * 10/1975 Hehl ....................... B29C 45/82
                                                                   222/496

(Continued)

FOREIGN PATENT DOCUMENTS

WO    WO 2006 080807    8/2006

OTHER PUBLICATIONS

PCT Int'l Search Report—PCT/SG2012/000307 Mail date—Feb. 26, 2013, Meiban International PTE Ltd et al.

(Continued)

*Primary Examiner* — Nahida Sultana
(74) *Attorney, Agent, or Firm* — Saile Ackerman LLC; Stephen B. Ackerman; Rosemary L.S. Pike

(57) ABSTRACT

The present invention relates to a method for use in injection molding with the capability to have precise and adjustable control of the molten plastic flow when molding at least two (2) non-identical (i.e. with more than 50% difference in weight or form) or identical complex-shaped and intricate plastic parts at the same time, utilizing a mold with at least two (2) parting layers via a standard conventional injection machine. This invention incorporates the principle of having two (2) valve pins in which their movements are back-to-back and can be independently opened and closed as controlled by stepper, servo or linear motors linked to a separate independent tool controller. The two (2) valve pins are positioned at the floating half of the mold for sequential, stack or multi-layer mold with multiple cavities.

15 Claims, 12 Drawing Sheets

(56) References Cited

U.S. PATENT DOCUMENTS

| | | | |
|---|---|---|---|
| 4,244,909 A | 1/1981 | Gellert | |
| 4,394,117 A * | 7/1983 | Taylor | B29C 45/263 425/549 |
| 5,478,230 A | 12/1995 | McGrevy | |
| 6,632,079 B1 | 10/2003 | Kazmer et al. | |
| 6,722,874 B1 * | 4/2004 | Moser | B29C 45/281 425/564 |
| 6,884,961 B1 | 4/2005 | Dmitriev et al. | |
| 7,175,420 B2 | 2/2007 | Babin et al. | |
| 7,192,268 B2 | 3/2007 | Okamura et al. | |
| 2002/0164392 A1 | 11/2002 | Kazmer et al. | |
| 2004/0208951 A1 * | 10/2004 | Bealer | B29C 45/66 425/595 |
| 2007/0071848 A1 * | 3/2007 | Wohlrab | B29C 45/66 425/589 |
| 2008/0014296 A1 * | 1/2008 | Tooman | B29C 45/281 425/145 |
| 2009/0266840 A1 * | 10/2009 | Brand | F04B 13/00 222/1 |
| 2010/0206680 A1 * | 8/2010 | Hung | F16D 11/14 192/69 |
| 2016/0001486 A1 * | 1/2016 | Lefebure | B29C 49/06 215/44 |

OTHER PUBLICATIONS

Written Opinon of the Int'l Searching Authority PCT/SG2012/000307 Mail date—Feb. 26, 2013, Meiban International PTE Ltd et al.

* cited by examiner

SELF-BALANCING HOT RUNNER WITH INDEPENDENT FLOW AND PRESSURE CONTROL

This application claims benefit to and is a Continuation of PCT Application number PCT/SG2012/000307, filed on Aug. 31, 2012, and claims priority to Great Britain Application number 1205091.0, filed on Mar. 23, 2012.

The present invention relates to a method for use in injection molding with the capability to have precise and adjustable control of the molten plastic flow, when molding at least two (2) non-identical (i.e. with more than 50% difference in weight or form) or identical complex-shaped and intricate plastic parts at the same time, utilising a mold with at least two (2) parting layers via a standard conventional injection machine. This invention incorporates the principle of having two (2) valve pins in which their movements are back-to-back and can be independently opened and closed as controlled by stepper, servo or linear motors linked to a separate independent tool controller. The two (2) valve pins are positioned at the floating half of the mold for sequential, stack or multi-layer mold with multiple cavities.

For a given injection shot, molten plastic from the barrel of the injection molding machine is injected through the mold cavity at a predetermined set injection pressure (from injection machine barrel) and injection speed from the injection machine screw piston. During the injection phase, the independent tool controller will control the movement of the valve pins via the use of stepper motors, servo or linear motors. Depending on the complexity and geometry of the plastic part to be moulded using a sequential, stack or multi-layer mold with multiple cavities, each valve pin can be opened and closed independently, either partially or fully so as to regulate the injection pressure and speed provided by the injection barrel and injection screw piston in order to achieve the desired flow-rate for the molten plastic to flow inside the respective mold cavities on the floating half of the mold.

Once the mold cavities at both ends of the floating half of the mold (i.e. for sequential, stack and multi-layer mold etc.) has been filled with molten plastics, the valve pins will be totally shut to prevent any drooling occurrence when either side of the mold is opened.

The present invention describes the possible actuating mechanism for an independently controlled back-to-back movement of the two (2) valve pins. The valve pins can be either threaded or non-threaded and with the option to be actuated by gears or sliders. The present invention describes two (2) proposed configurations, which allow the user with the flexibility to accurately and independently control and adjust the injection molding parameters for the product. Both configurations not only serve to accurately control and adjust the injection molding parameters, but they also do enable the design of the tool/mold to be compact and yet effective, hence saving tooling and molding costs.

FIELD OF INVENTION

The present invention relates generally to injection molding system and methods, and more particularly to an injection molding system and method which is capable of having precise control in the molten plastic flow when molding at least two (2) non-identical complex-shaped plastic parts that can be molded at the same time using sequential, stack or multi-layer mold with at least two (2) parting layers via a standard conventional injection machine. At the same time, it solves some of the common problems associated with using a hot runner system on the floating half of the sequential, stack or multi-layer mold in a standard conventional injection-molding machine such as plastic part balancing, variations in plastic part weight, dimensions and mechanical properties, etc.

The present invention described here is applied to a tool (or mold) with two (2) parting layers for sequential, stack or multi-layer mold that can move in sequential, alternate or simultaneous motion.

BACKGROUND OF THE INVENTION

The use of hot runner in injection molding process for manufacturing plastic products is a common manufacturing process in the plastics industry. It is well-known in any prior art that in any hot runner system, it generally involves a polymeric material which is in molten form and is being injected into the hot runner's manifold system that is linked by one or more hot runner nozzles. The heated nozzles help to maintain the plastic material in molten state, and help to guide the molten melt flow into one or more of the mold cavities. The molten melt plastic is then cooled in the shape of the mold cavity, followed by part ejection when the mold is open.

In any hot runner system, the flow of hot molten melt via the runner layout into the mold cavity plays an important part in that it affects the quality of the plastic part to be molded. Valve gated mechanisms for injection molding play an integral part in controlling the flow of molten plastics to the mold cavity. Different designs and configurations are available out there for different product and process requirements. Before we describe further on the different internal valve gate designs, it is probably interesting to remember what are the causes and effects given by a basic barrel in terms of injection molding parameters. In fact, in most of the cases, the valve gate system designs are developed to solve the cosmetic problem of the molded plastic part, weld-line control of the molded part, and adjustment of the flow rate and/or injection pressure mainly on the fixed half of the mold for the molten plastic to flow into the standard mold cavity or multi-cavities.

A typical injection molding process is divided into 2 phases, i.e. the dynamic injection phase or filling-packing phase, followed by the quasi-phase, which is also termed as post-filling phase or holding phase. The more relevant importance to this discussion for the present invention would be the dynamic phase as the post-filling phase could be corrected by any system or injection molding machines currently available in the injection molding market.

For the dynamic phase operation within the barrel of the injection-molding machine, the screw-piston movement monitoring and the plastic molding cushion within the barrel of the injection-molding machine are important factors to note. The importance of monitoring the movement of the screw-piston within the barrel of a typical standard conventional injection-molding machine must not be neglected in order to ensure repeatability in the quality of the plastic part to be produced cycle after cycle. Given the fact that each polymeric materials exhibit its own pseudo or viscous-elastic polymeric behaviour, factors like the flow-rate of the molten plastic, injection speed, injection pressure etc are all important parameters that would affect the quality of the plastic part produced. Studies have shown that by controlling the flow-rate of the molten plastic for the product to be injected, it will have an effect on the anisotropy of the final plastic part.

The importance of having plastic molding cushion within the barrel is important in any injection molding process. The purpose of a cushion is to transmit plastic pressure through the sprue, runners and gates as well as the cavity for packing a plastic part. Thus, the cushion does affect the pressure drop within a standard conventional injection-molding machine. For any conventional standard injection machine, usually there is only one (1) plastic cushion. Hence for any sequential, stack or multi-layer cavity mold with more than two (2) parting layers and running at least two (2) non-identical and complex plastic parts, the volume of material filling the first ($1^{st}$) and second ($2^{nd}$) parting layer would not be the same. The cushion can control the backflow of the molten plastic melt during the injection phase, hence improving the quality of the moulded part. In the current market, most of the valve gate designs do not take care of the backflow of molten plastic melt on floating half of the mold since the volume of material filling the first ($1^{st}$) and second ($2^{nd}$) parting layer is not the same. Hence, the design in the present invention is meant to solve the backflow issues associated with the floating half of the mold.

As described briefly in the previous paragraphs, parameters like flow-rate and pressure are very important in any injection molding process. Thus, the influence of the dynamic phase of injection on the final characteristics of the plastic part must not be neglected.

Using the well-known Bernoulli's Principle for any incompressible fluid (i.e. liquid molten plastics), the flow-rate and pressure are directly linked to each other. With an increase in the flow rate of the fluid, the velocity of the fluid will increase as well and the pressure will simultaneously decrease. This phenomenon can be expressed using Bernoulli's Principle:

$$\frac{p}{\rho} + \frac{V^2}{2} + gz = \text{constant}$$

Where "p" is pressure, "μ" is fluid density (assumed constant), "V" is flow velocity, "g" is the acceleration of gravity, and "z" is the elevation of the fluid particle. The relation applies along any particular streamline of the flow. The constant described in the equation may vary across streamlines unless it can be further shown that the fluid has zero local angular velocity, which is obviously not be the case for this present invention described here.

By applying the Bernoulli's Principle, it will also be easy to understand that a conventional valve gate nozzle in both standard and two (2) layer mold with or without a variable opening and closing of the gate will be not able to independently control the flow-rate and pressure. In a conventional injection molding application, either flow-rate or pressure could be adjusted by the injection machine itself via the barrel as well as simultaneously having the valve gate nozzle adjusting either flow-rate or pressure. Such an adjustment of flow-rate and pressure is typical in any injection molding process.

For a multi-gate system using a standard conventional valve gate nozzle, it will be more difficult to have independent flow-rate and pressure adjustment at the same time. The injection barrel could effectively cover only one action with a few different gates, and each individual gate could then be re-adjusted by the respective individual valve gates, based on the Bernoulli's Principle highlighted previously concerning the relationship between flow-rate and pressure. This would mean that it would be nearly impossible to inject simultaneously two (2) good quality parts with too high a difference in terms of weight or form, for example having more than 50% difference in weight consisting of one long and thin part and another part, which is big and thick.

Similarly, if we consider the case of sequential injection molding having two (2) mold layers, with a first ($1^{st}$) nozzle being able to feed the first ($1^{st}$) mold layer and a second ($2^{nd}$) nozzle being able to feed the second ($2^{nd}$) mold layer, it is not very difficult to understand that the pressure loss will be totally different in the second ($2^{nd}$) mold layer, making the injection molding process particularly difficult. Such scenario is particularly common, especially since the adjustment of the flow-rate and pressure parameters usually works well for either one (1) of the two (2) mold layers but not for the two (2) mold layers moving at the same time simultaneously or sequentially. Such a scenario could not be easily solved on any standard conventional injection-molding machine. However, there are other injection molding systems available out there to solve such specific requirements but costs play an important influencing factor in the market, and additional investments would be needed in procuring for such systems.

Various methods in the prior art out there are available to control the flow of molten plastic melt into the cavity in order to ensure good quality plastic product being produced. However it has been found that the prior art systems available out there are not able to effectively and accurately control the flow rate of the molten plastic and injection molding pressure independently in order to have more accurate and precise control of the molten plastic in the floating half of the mold on a standard conventional injection machine, especially in producing two (2) non-identical complex and intricate-shaped plastics parts at the same time. For example, most of the prior art systems which are not able to accurately control flow rate and injection pressure independently faced a strong likelihood of encountering common molding defects like weld lines, internal bubbles, flashing due to over-packing, etc. A strong weld-line can make a difference for any typical consumer plastic part under warranty. A weak weld-line could potentially be created using prior art systems with inaccurate control of the flow-rate of the molten plastic and the injection molding pressure, leading to inaccurate filling of the molten plastic, hence affecting the mechanical properties of the finished plastic part. This is especially so for multi-cavity mold where the flow of molten plastic is important. Over time, this would affect the quality of the plastic part under warranty, which would result in the quality department implementing more checks, especially if the plastic part is a basic product molded at low costs using a typical smart valve gate/pin nozzle system described in the prior art. Such additional checks will incur unnecessary additional costs and is not productive.

Therefore, the importance of balancing a hot runner system by independently adjusting the flow-rate and pressure cannot be neglected as balancing the hot runner system results in overall higher quality moulded parts moulded with uniform filling. This is especially so for multi-cavity mold running on a standard conventional injection machine which typically encounter problems in molding good quality parts with cosmetic issues related to weld-lines, internal bubbles, etc. being eliminated.

Many prior art designs and systems are being disclosed to control the flow of molten plastic into the mold cavity via the use of valve gate or valve pins.

Some representatives examples of such prior art designs for valve gates or valve pins are disclosed. Examples are U.S. Pat. Nos. 4,244,909; 5,478,230; 6,632,079; 6,884,961; 7,192,268 and 7,175,420.

Gellert's U.S. Pat. No. 4,244,909 discloses a method of transferring molten plastic melt for stack molding, consisting of a valve gate located at the stationary mold plate in alignment with another valve gate located at the moving floating half, which communicates to another back-to-back valve gate via the runner passage within the moving floating half of the mold as well. The arrangement of the back-to-back valve gates within the floating half of the stack mold with the valve gate on the fixed half of the mold are all in-line with each other in a single direction. The valve gates in U.S. Pat. No. 4,244,909 are either 100% fully open or fully close during the operation with no variable adjustment or control. Our present invention disclosed is able to independently adjust and vary the opening and closing of the valve gates, hence offering better control in molding at least two (2) different non-identical plastic parts with complex and intricate shapes and sizes.

McGrevy's U.S. Pat. No. 5,478,230 discloses a manifold system with multiple passages and its associated pistons with valve gates in a back-to-back in-line relationship, with the system designed to prevent fluid leakage when the whole manifold is heated up. The valve gates are either 100% fully open or fully close during the operation. With reference to the Bernoulli's Principle explained in the previous paragraphs, the embodiment in U.S. Pat. No. 5,478,230 will not be able to independently adjust and control the flow-rate and pressure. Moreover, the flow of the molten plastic is transferred from an inlet to a plurality of passages leading to the valve gates, rather than flowing in a uni-directional single manner towards the valve gates directly as described in the present invention. This present invention disclosed consists of valve gates arranged in a back-to-back in-line arrangement with the flow of the molten plastic melt flowing directly to the valve gates. In addition, the present invention is able to independently adjust and vary opening and closing of the valve gates, hence offering better control in molding at least two (2) different non-identical plastic parts with complex and intricate shapes and sizes.

Synventive's U.S. Pat. No. 6,632,079 disclosed a hot runner system having a hydraulic power source, a manifold for distributing material injected from said injection molding machine to a plurality of gates leading to one or more mold cavities, and a controller cum transducer (i.e. position or pressure) for individual control of material injected through the gates during injection cycle. Synventive's U.S. Pat. No. 6,632,079 is able to separately adjust and control the flow-rate and pressure, with the manifold system being included to give the user with a possibility to adjust separately the rate of melt flow to each nozzle. However, the negative aspect of the system disclosed in Synventive's U.S. Pat. No. 6,632,079 would be the complexity of the final assembly, making it difficult to be implemented on a two-layer mold. The cost of developing such a system disclosed in Synventive's U.S. Pat. No. 6,632,079 will be expensive. For example, the presence of sensors embedded inside the tool (or mold) will mean that maintenance and assembly will be difficult, hence increasing the overall maintenance and assembly costs. In addition, if the valve pin is damaged and needs to be replaced, the user would need to fully dismantle the system in order to replace the valve pin, hence increasing the downtime of the tool. Our present invention disclosed has the advantage and flexibility of being able to be implemented on the floating half of the mold for either sequential, stack or multi-layer mold with multi-cavities. In addition, the present invention disclosed eliminates the need for a controller cum transducer system since it is dynamically controlled, hence providing faster response as well as saving costs. The embodiment described in our present invention would mean that maintenance and assembly costs would be lower since the design is simpler to assemble and maintain. No sensors are required in the present invention, with the dynamic action being mechanically actuated by the motors (i.e. stepper, linear or servo) which are externally located, facilitating the user operator to easily assemble and maintain.

Okamura et al's U.S. Pat. No. 7,192,268 disclosed comprises of a manifold having a manifold channel for receiving the molten pressurised plastic melt and delivering the molten plastic melt to a nozzle channel of a hot runner system. Sensors are installed to control and adjust the amount of flow of the molten plastic melt into the mold cavity. Pressure and flow-rate are individually adjustable and easily maintained by two (2) simple multi-layer valve pins installed within the back-plate of the tool. In addition, the system described in Okamura et al's U.S. Pat. No. 7,192,268 is able to improve the quality of the production. However, the downside is that it needs a manifold system, hence making it difficult to be implemented on a two (2) layer tool. For a two (2) layer tool, one can implement another similar design in the reversed manner, but this would mean that the size of the tool would be extremely massive, hence having the need to use a bigger or extended injection-molding machine. Therefore, the system described in Okamura et al's U.S. Pat. No. 7,192,268 is suitable for single layer tool rather than two (2) parting layer tool. Our present invention disclosed has the advantage of being able to be implemented on a two-layer mold, especially on the floating half of the mold for either sequential, stack or multi-layer mold with multi-cavities without the need of a manifold. In addition, the present invention disclosed eliminates the need for a sensor system since it is dynamically controlled, hence providing faster response as well as saving costs. Similarly, our present invention has a much simpler and compact design, making it easier to assemble and maintain. Hence, assembly and maintenance costs are lower as compared to Okamura et al's U.S. Pat. No. 7,192,268.

Babin's U.S. Pat. No. 7,175,420 discloses actuated valve gates within a manifold in which the movements of the valve gates are independently actuated and can control the flow-rate and pressure for each cavity via the use of controller-sensor system. Similarly, the embodiment described in U.S. Pat. No. 7,175,420 is almost as difficult to be implemented on a two (2) parting layer mold. The embodiment described in U.S. Pat. No. 7,175,420 is for single layer tooling with two (2) valves in-line with the overall tool shown to be quite thick. Hence if the same embodiment described in U.S. Pat. No. 7,175,420 was to be applied on a two (2) parting layer tool, it would increase the overall thickness of the tooling. Moreover, the embodiment described in U.S. Pat. No. 7,175,420 proposed having an inclined valve pin situated directly inside the nozzle. This would not be appropriate for a two (2) layer mold since this would mean that the nozzle would become particularly large, hence reducing the possibility of using small pitching between the products especially in a two (2) layer mold with multi-cavities tooling. Hence the possibility of implementing the embodiment described in U.S. Pat. No. 7,175,420 on a two (2) layer mold would result in a thick tooling, making it incompatible to use with majority of standard daylight conventional injection molding machine. However, our present invention disclosed can independently adjust and control the flow-rate and pressure for the molten plastic melt with the added advantage of being able to be implemented on the floating half of the mold for either sequential, stack or multi-layer mold with multi-cavities. In addition, the present invention disclosed eliminates the need for a sensor system since it is dynamically controlled, hence providing faster response as well as saving costs. Moreover, the design disclosed in the present invention is smaller and compact as compared to Babin's U.S. Pat. No. 7,175,420, hence making it cheaper and less expensive to fabricate the mold.

Hence, to summarise, most of the systems and designs described here can easily control and vary flow-rate of the molten plastic melt into the mold cavity, be it a standard mold or sequential, stack or multi-layer mold etc. Some might even be capable of compensating for pressure drop changes. However it is not easy to balance the flow-rate and pressure drop at the same time for a particular injection mold shot, especially in molds with at least two (2) or more parting layer, e.g. in sequential mold, stack mold, multi-layer molds, etc. and for molding complex non-identical plastic parts. In addition, most of the systems and designs described in the prior art required sensors which are embedded deep inside the tool, hence making it difficult to maintain and assemble back, even affecting the valve pin replacement. Moreover most of these designs in the prior art tend to be too big when fabricated, given the limitations of the daylight in any injection molding machine, hence having an impact on the overall mold or tooling costs.

SUMMARY OF THE INVENTION

The present invention serves to differentiate itself from the rest in the prior art with the provision of solutions that could either be gears-driven or slider-driven.

Gears-Driven

By providing two (2) independently controlled back-to-back in-line arrangement of threaded valve pins on the floating half of the mold within the nozzle system, with the actuator being the worm drive consisting of worm wheel driving the worm gear which in turn rotates the threaded portion of the valve pins, with the worm drive powered by stepper, servo or linear motors, whereby the worm gears are internally-located within the nozzle of the injection molding machine and the control parameters are controlled by a separate, independent, self-contained control system, also referred to herein as an Independent Tool Controller (ITC), which may be readily attached to and readily removed from the molding machine, tool/mold and/or auxiliary equipment.

Slider-Driven

By providing two (2) independently controlled back-to-back in-line arrangement of non-threaded valve pins on the floating half of the mold within the nozzle system, with each non-threaded valve pin actuated by a slider that is connected to an angular pin actuated by gear drive that in connected to either stepper, linear or servo motors. Similarly, the control parameters are controlled by a separate, independent, self-contained control system also referred to herein, as an Independent Tool Controller (ITC), which may be readily attached to and readily removed from the molding machine, tool/mold and/or auxiliary equipment.

Advantages

The present invention serves to differentiate itself from the prior art in the following manner:

(a) The present invention disclosed here serves to adjust and control the flow-rate of the molten plastic while keeping the other parameter like pressure to be constant, or vice-versa, especially during the filling phase of the molten plastic melt into the cavity. It is a form of dynamic control cum adjustment without the need to rely on external sensors. The present invention discloses the use of at least a minimum of two (2) valve gates, which can be gears-driven or slider-driven to accurately control the amount of opening or closing of the valve gates. The movement of the two (2) valve gates can be independently controlled. In doing so, the flow-rate parameter is being treated as to be fully dynamic rather than static based on a predefined opening linked to a command given by a controller linked to the sensor. Details on how the dynamic control operates would be described in the later paragraphs under "Description of the Preferred Embodiment".

(b) The present invention disclosed here eliminates the need for the use of a sensor. For a dynamic control, this would mean that under certain molding conditions that require precision control in the molding parameters like flow-rate, pressure, etc, the form of dynamic control proposed in the present invention would be able to have a faster response compared to using sensor. Similarly, to any electronic components, the sensor will typically have a tolerance approximately +/−5%. Another point to note is that the response times for the sensor as well as the response time of the controller are both linked and hence the response time to adjust the parameters might not be as rapid especially at a particular short notice. Besides, over long usage of the use of sensors, there could potentially be some leakage problem associated with the use of sensors. Coupled with the fact that the sensors will be subjected to heavy-usage (e.g. high temperature, dirt, etc.); it might contribute to lower efficiency in the use of the sensor over long period.

(c) The present invention can be used particularly for sequential mold with at least two (2) parting layers, with or without the need for a hot runner manifold and yet still be able to mold at least two (2) independent non-identical plastic parts (i.e. with more than 50% difference in weight or form) at any one time via a single injection shot. The proposed embodiment in the present invention enables more accurate control and adjustment of the injection molding parameters between the different layers of the molds especially flow-rate and pressure to each mold cavity for sequential, stack or multi-layer cavity mold that could move in either sequential, simultaneous or alternate motion.

(d) Without the need for a hot runner manifold at the floating layer of the mold, this would mean that the proposed embodiment described in the present invention is compact. Hence, this would mean that the proposed invention described here is able to fit existing injection molding machines with limited daylight, thus avoiding the need to purchase another extended daylight injection-molding machine if one were to use other potential designs available in the market.

(e) The two (2) different actuating means (i.e. gears-driven and slider-driven) describe in the present invention provides the option and flexibility for the user in different molding environments stipulated by certain industries.

BRIEF DESCRIPTION OF THE DRAWINGS

The drawings attached here are to aid in better understanding of the description of the invention here. The drawings are not to scale and they are to be used for merely illustrating the principles and concepts of the invention. For better illustration of the present invention, the description of the invention will only be explained using the operation of two (2) parting layers sequential mold. The operation and concept is similar to that of other molds like stack, multi-layer mold with multiple cavities, etc.

To aid in the description of the invention, the drawings being presented here are essentially for the design of the two (2) valve pins, which are powered by different actuators, i.e. gears-driven and slider-driven actuating mechanism.

REFERENCE NUMBERS

Figure 1:
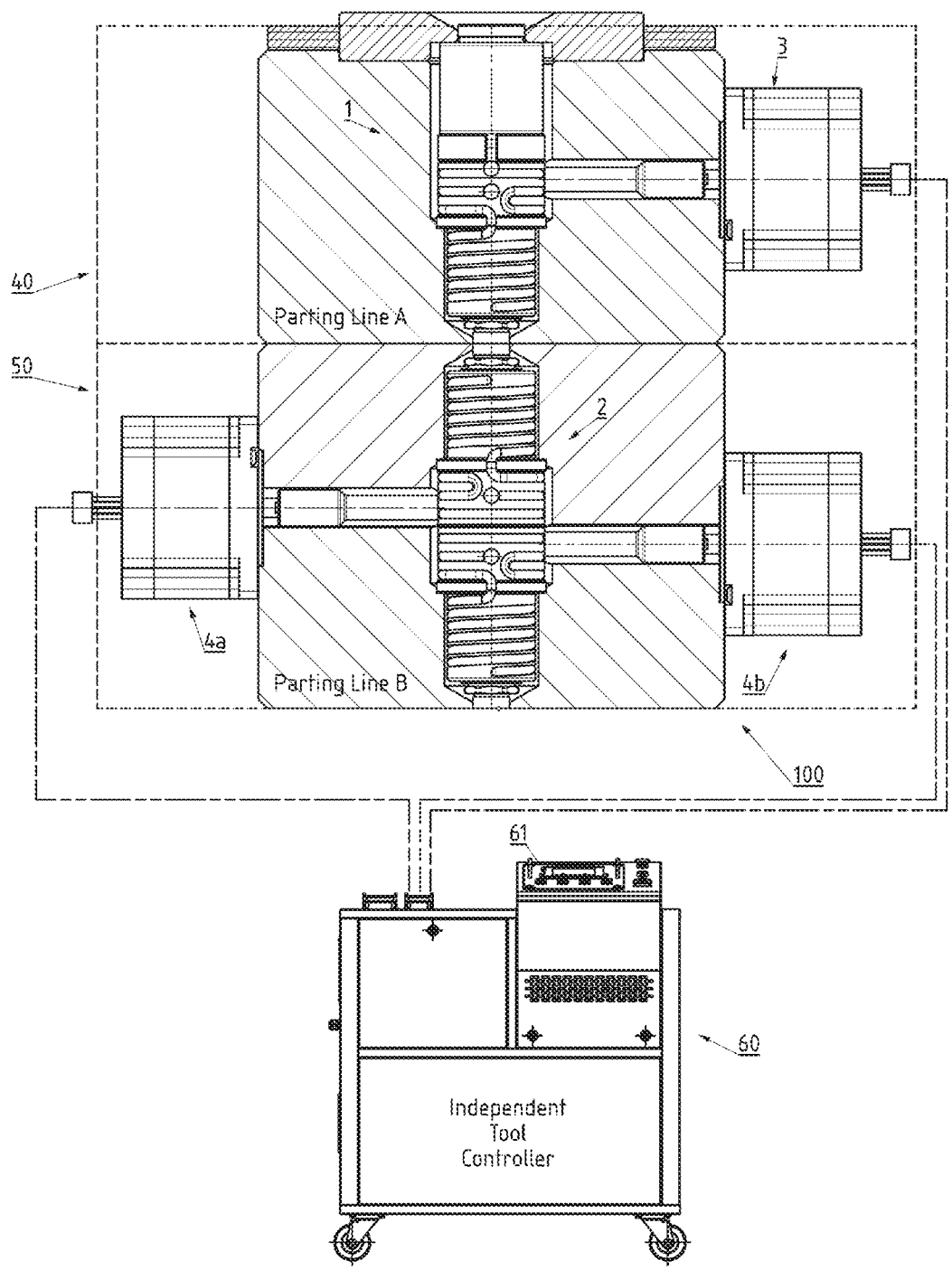
FIG. 1 schematically illustrates the partial section of the fixed half and floating half of a simplified sequential tool including a hot nozzle system controlled by stepper motors and powered by an Independent Tool Controller.

1 Hot nozzle
1a Nozzle Body
2 Hot nozzle
2a Nozzle Body
2b Nozzle Body
3 Stepper Motor
4a Stepper Motor
4b Stepper Motor
5a Input side (Parting Line A)
5b Input side (Parting Line B)
6a Output side (Parting Line A)
6b Output side (Parting Line B)
7 Pre-Nozzle
8 Heater
9a Runner Canal
9b Output Stream (runner canal)
9c Output Stream (runner canal)
10 Independent Heater
11a Runner Canal
11b Runner Canal
12 Threaded Valve Pin
13 Threaded Valve Pin
14a Runner Canal
14b Runner Canal
15 Heater
16 Heater
17a Runner Canal
17b Runner Canal
18 Threaded Valve Pin
19 Worm Wheel
20 Worm Wheel
21 Circular Area
22 Worm Gear
23 Gear
24 Gear
25 Worm Gear
26 Threads (for Valve Pin 18)
27 Circular Area
28 Threads (for Valve Pin 13)
29 Stroke A
30 Stroke B
40 Fixed Half of Sequential Mold
50 Floating Half of Sequential Mold
60 Independent Tool Controller
61 User Interface Control Panel
70 Graphical Plot (from standard conventional injection molding machine)
71 Curve
72 Curve
73 Curve
74 Area within curve
76 Parameter settings for "Machine"
77 Parameter settings for molding "Parting Line A"
78 Parameter settings for molding "Parting Line B"
100 Simplified sequential tool
101 Cavity
102 Core
103 Cavity
104 Core
113 Non-Threaded Valve Pin
118 Non-Threaded Valve Pin
119 Gear Drive
120 Hot Tip
122 Chamber
123 Slider
124 Slider
126 Angular Pin
127 Gear Drive
128 Angular Pin
130 Hot Tip
131 Final Gate
132 Chamber
133 Surface of valve pin
140 Canal Gate
141 Canal Gate
170 Canal Gate
171 Canal Gate
180 Hot Tip
181 Final Gate
182 Chamber

DETAILED DESCRIPTION OF THE PREFERRED EMBODIMENT OF THE PRESENT INVENTION

In the following description, stage-by-stage, details are provided to describe the embodiment of the application. Starting from the most basic approach of the concept to the most detailed and juicy information, this description will be apparent not only to a skilled person but also to a novice operator in understanding why such nozzles are absolutely essential in the plastic industry.

Some parts of the embodiments, which are shown in the Figures below, have similar parts. The similar parts have the same names or similar part numbers. The description of one similar part also applies by reference to another similar part, where appropriate, thereby reducing repetition of text without limiting the disclosure.

The description of the invention will only be explained using the operation of a two (2) parting layers sequential mold as the principle of producing plastic parts in a sequential mold is essentially similar to that of other mold with at least two (2) parting layers like stack mold, multi-layer cavity mold, etc. The difference would be the output of the parts produced, depending on the number of cavities available.

FIGS. 1, 2, 3*a*, 4*a*, and 5*a* are referring to the rule and functions of each components included inside a threaded valve pin hot nozzle based on a sequential tooling, and an independent tool controller connected to a conventional injection-molding machine.

Figure 3A:
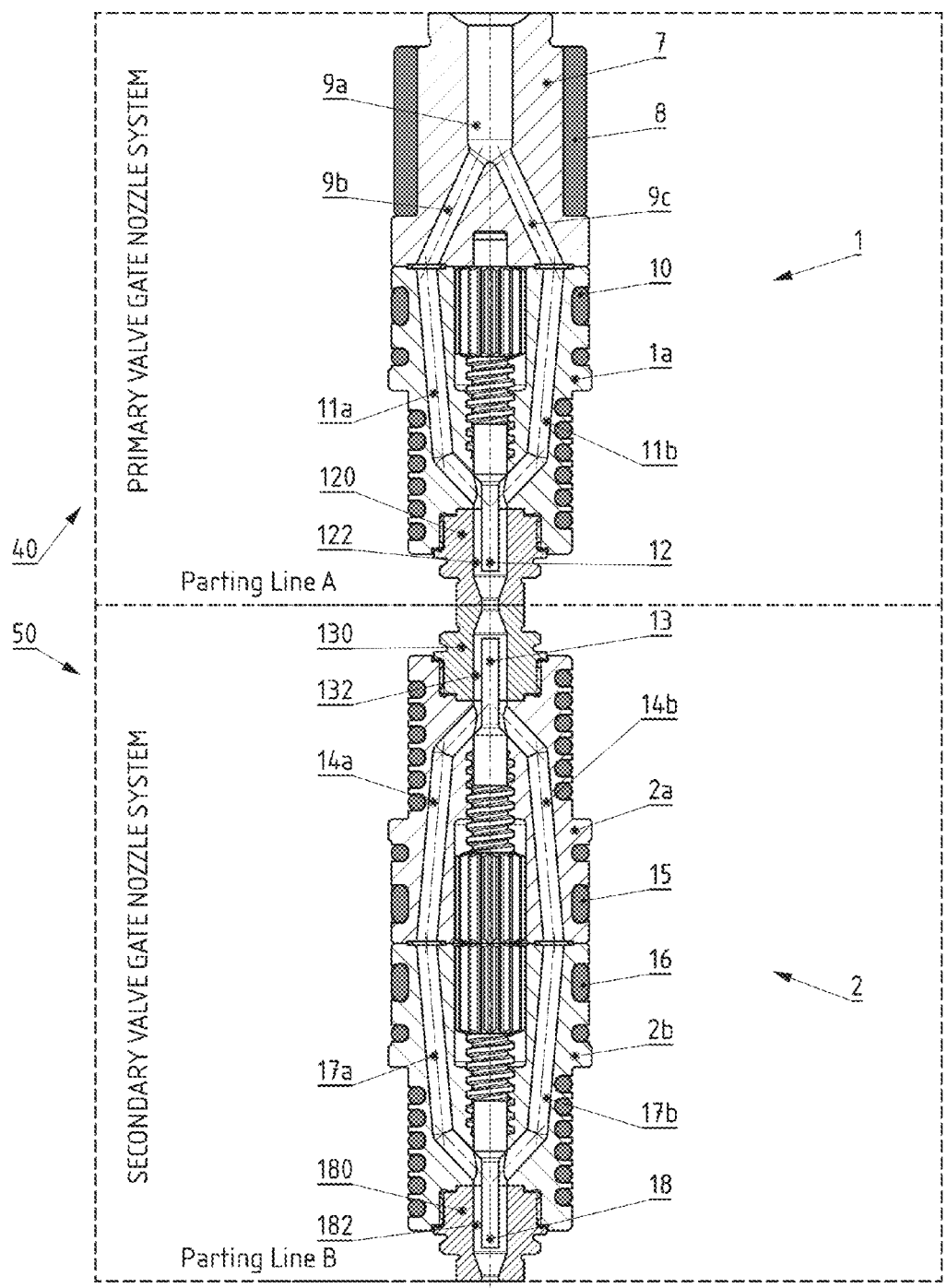
FIG. 3a schematically illustrates a detailed cross section of the threaded valve pins system in position inside a fixed half and floating half of a sequential mold.
Figure 3B:
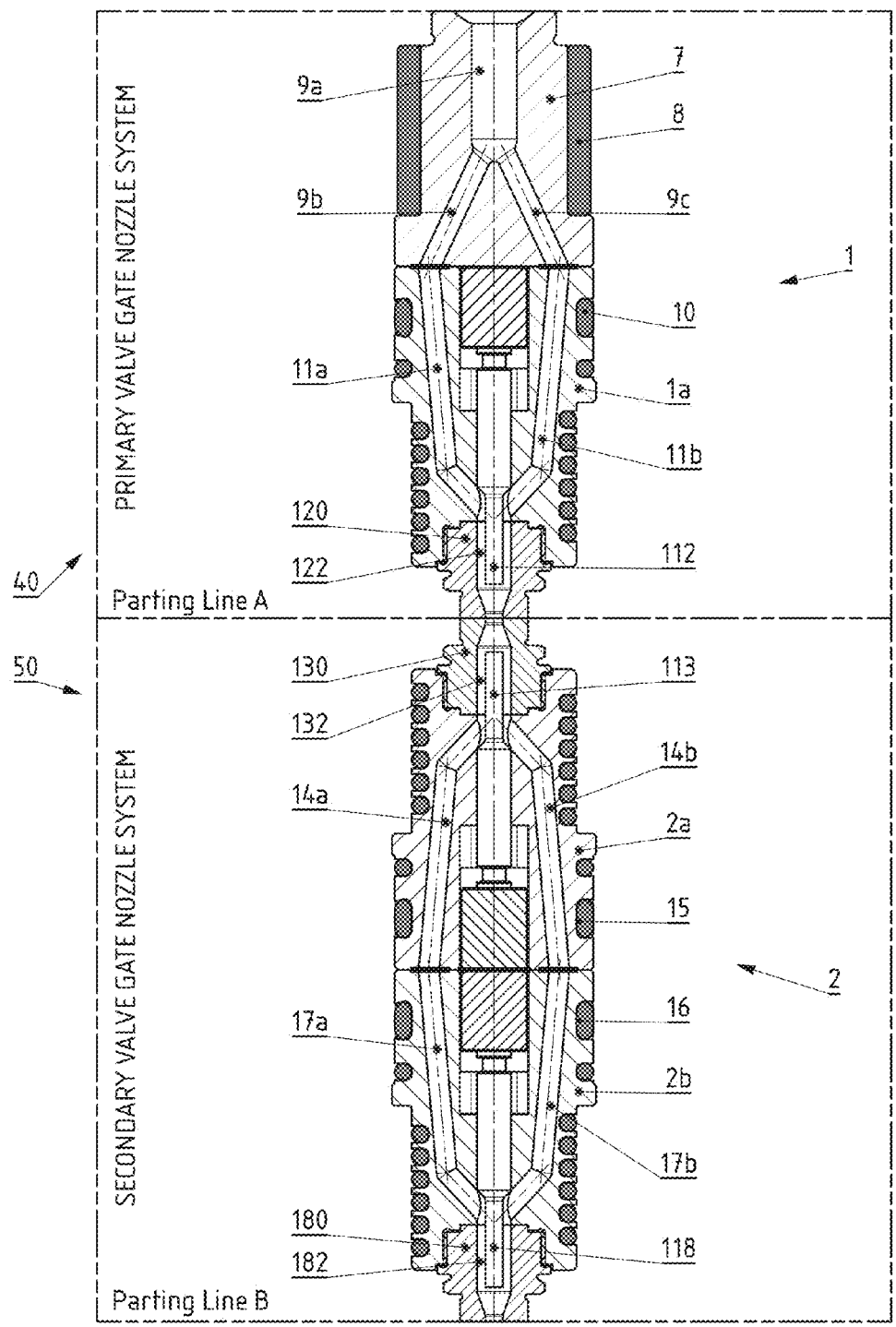
FIG. 3b schematically illustrates a detailed cross section of the non-threaded valve pins system in position inside a fixed half and floating half of a sequential mold.
Figure 4A:
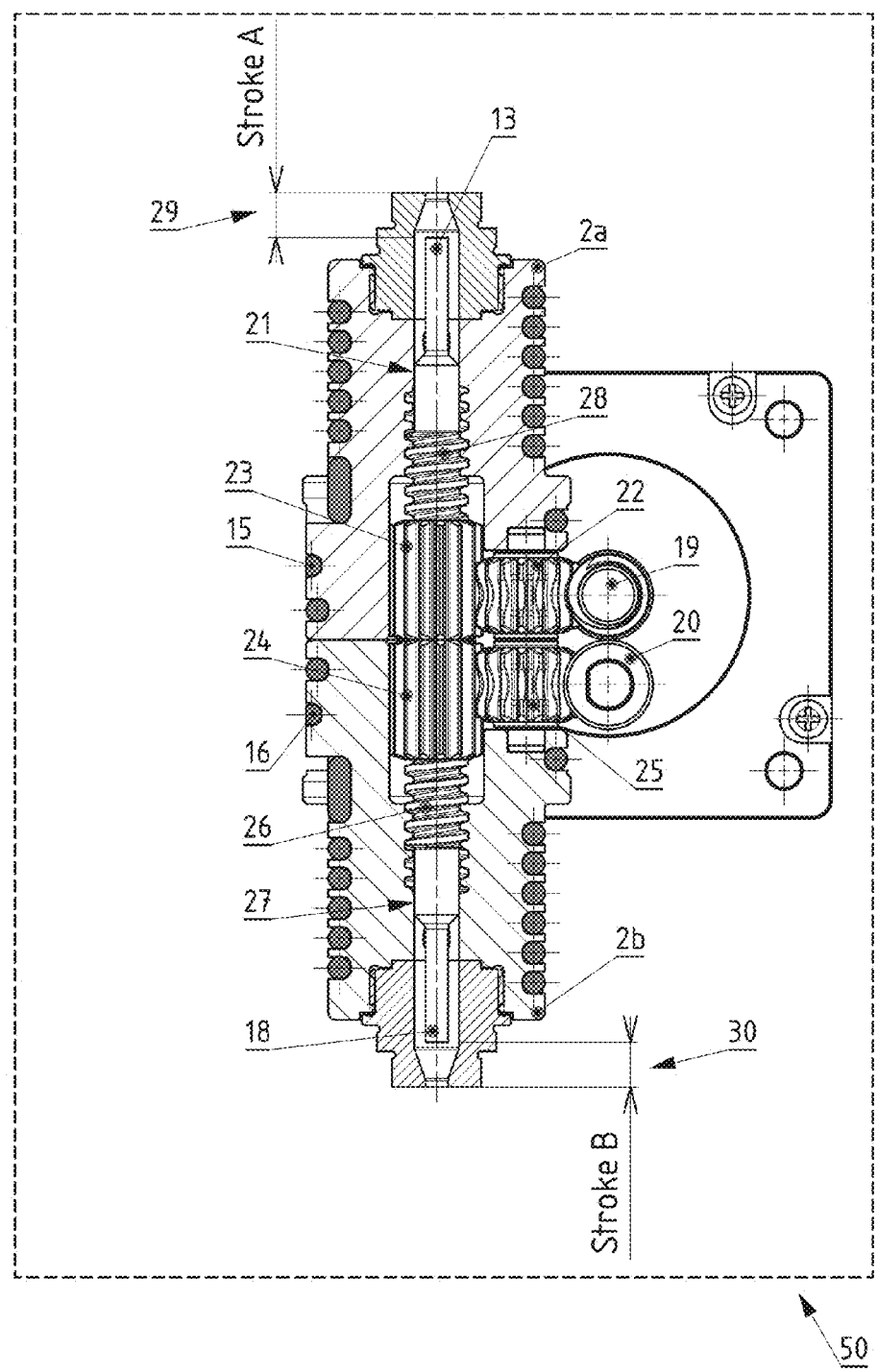
FIG. 4a schematically illustrates a new detailed cross section of the threaded valve pins, which highlight the mechanical (articulation) aspect of both valve pins system.
Figure 4B:
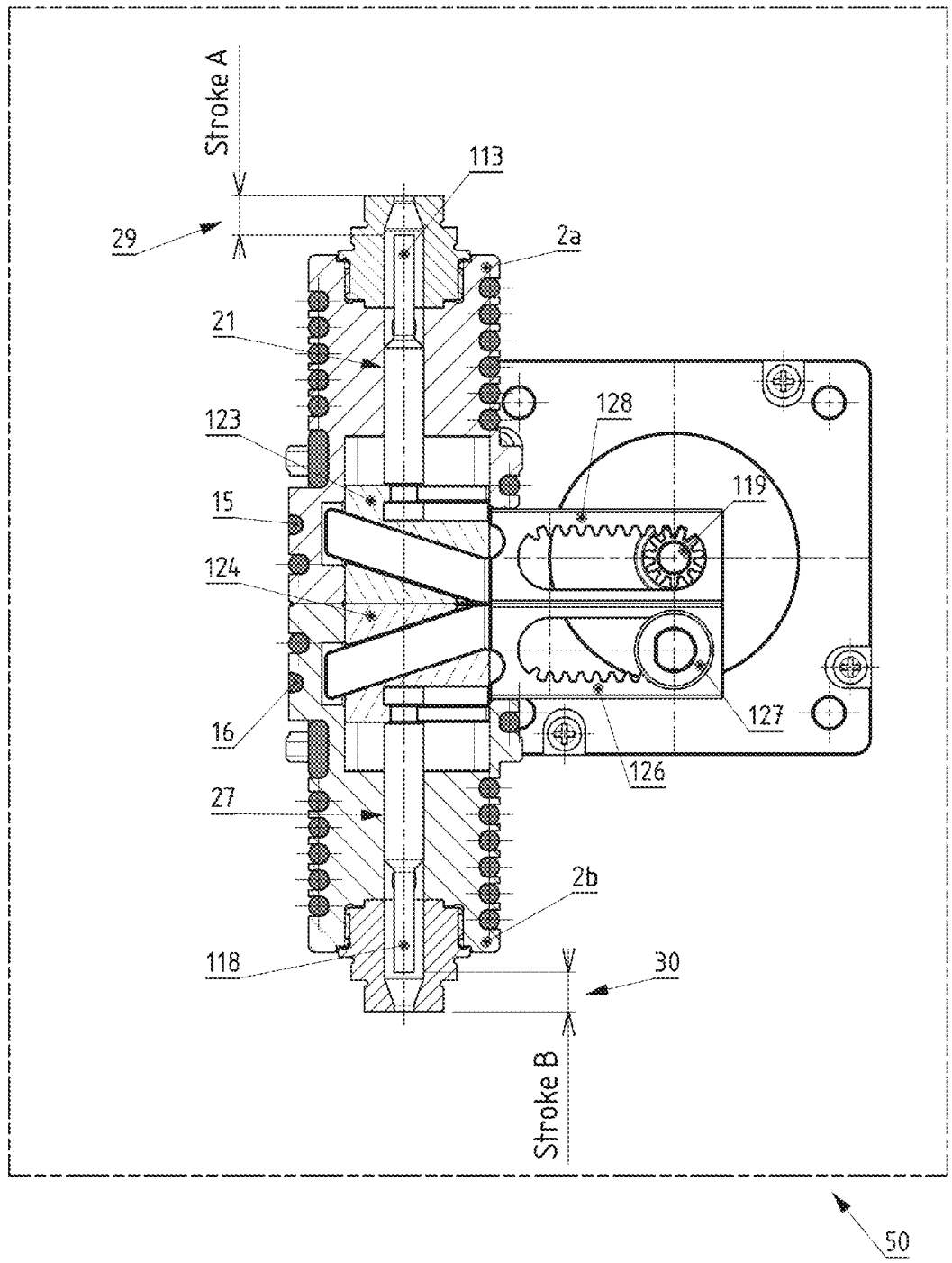
FIG. 4b schematically illustrates a new detailed cross section of the non-threaded valve pins, which highlight the mechanical (slide) aspect of both valve pins system.
Figure 5A:
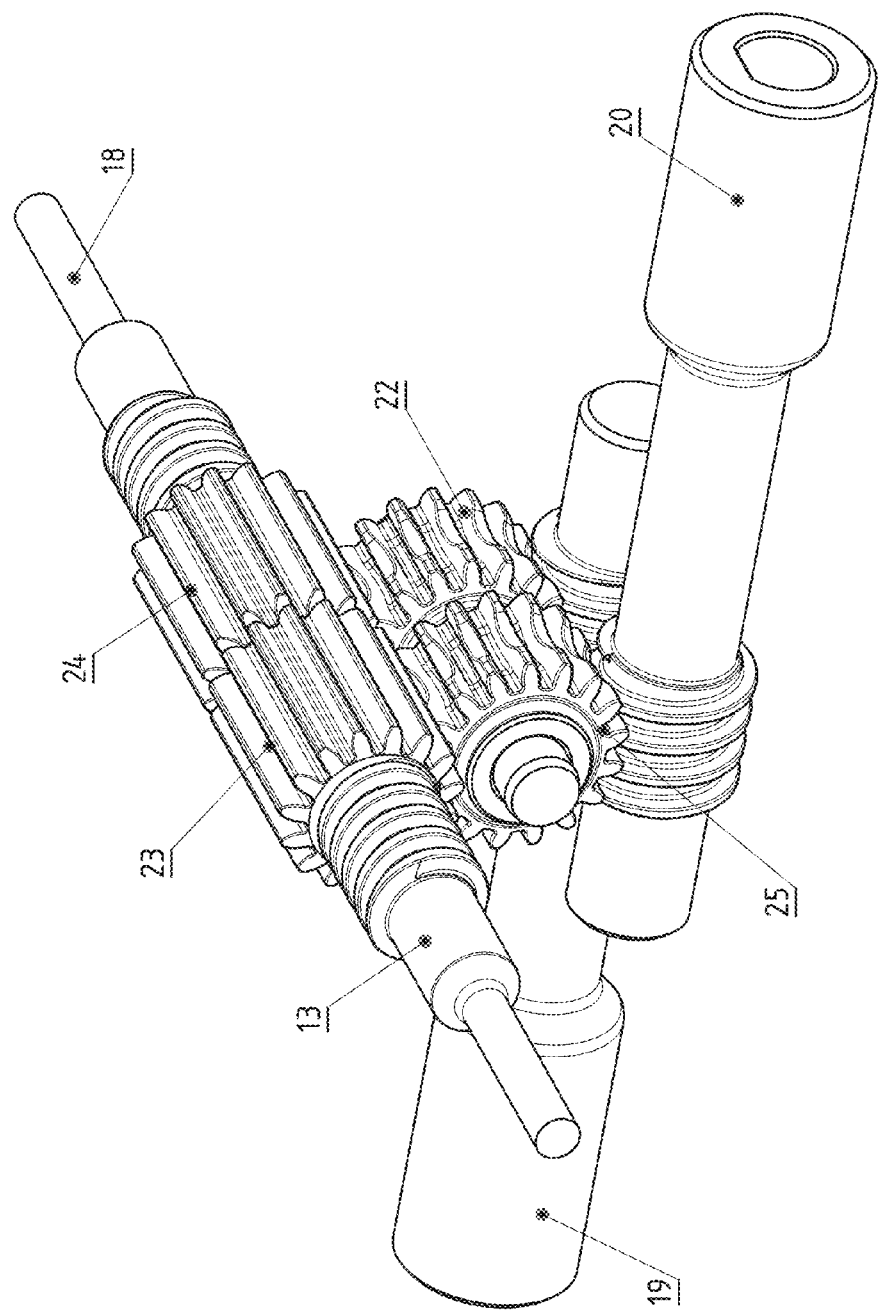
FIG. 5a illustrates a trigonometric view of the worm drive featuring the worm gear and worm wheel for a threaded valve pin.
Figure 5B:
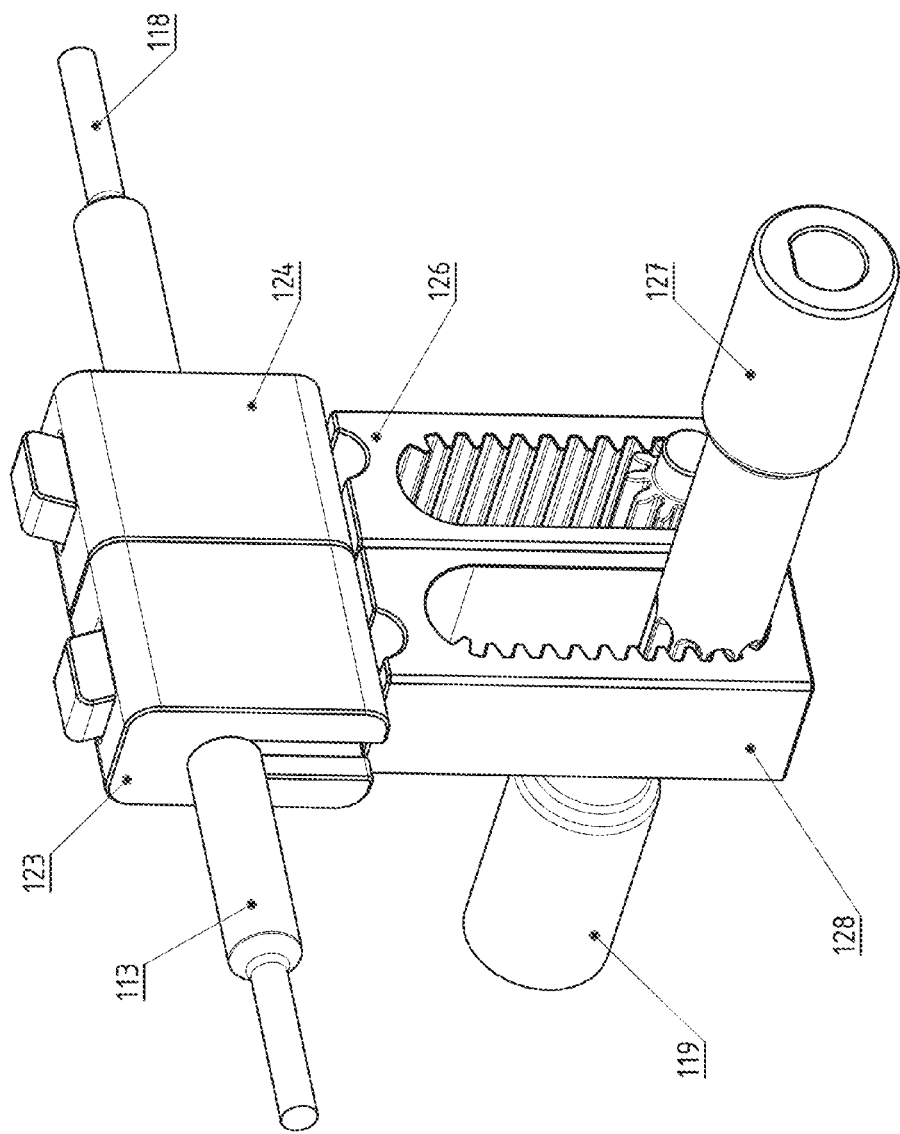
FIG. 5b illustrates a trigonometric view of the gear drive featuring the angular pin and slider for a non-threaded valve pin.

FIGS. 3*b*, 4*b*, and 5*b* are referring to the rule and functions of each components included inside a non-threaded valve pin hot nozzle based on a sequential tooling, and an independent tool controller connected to a conventional injection-molding machine.

Figure 6:
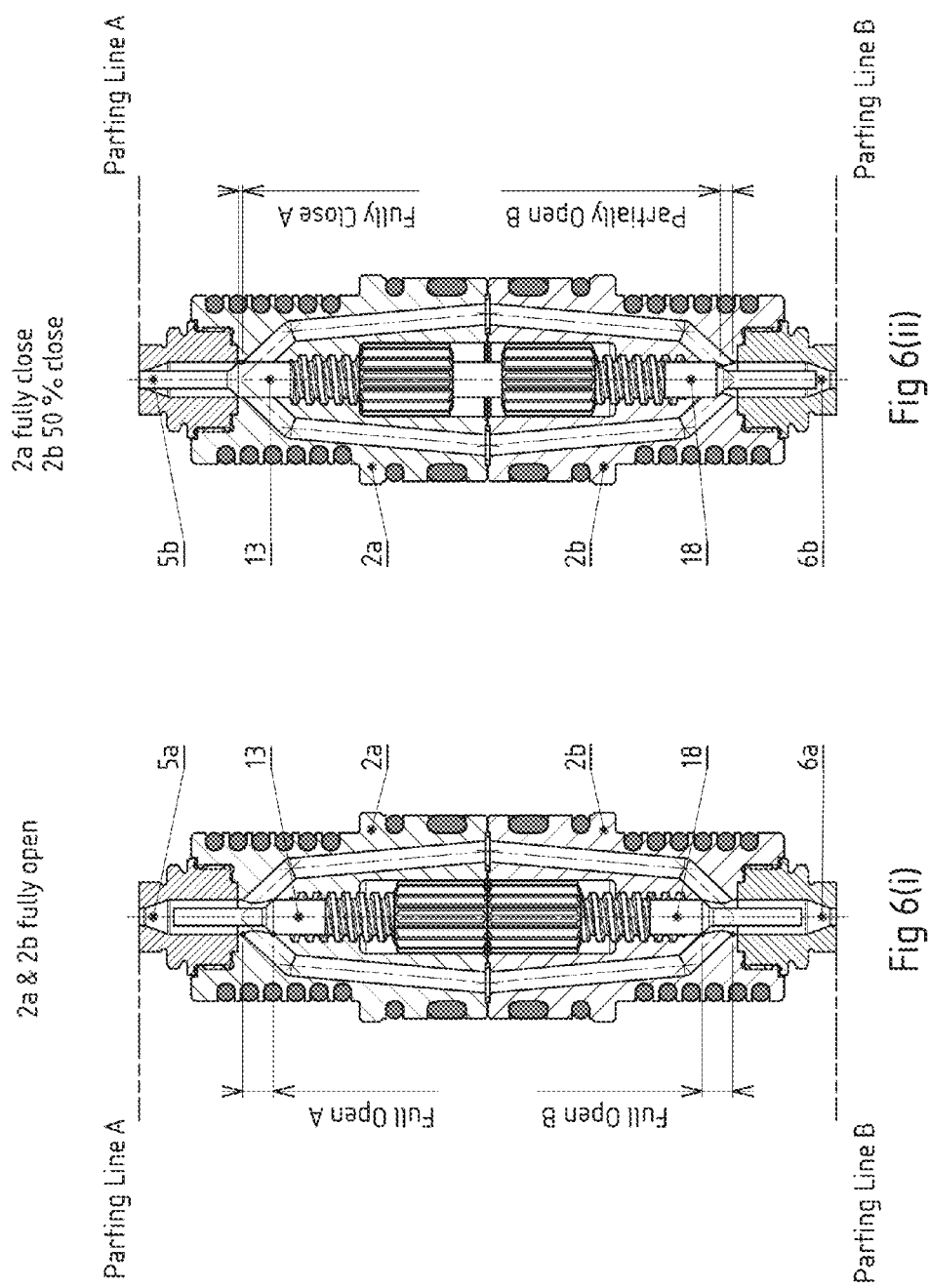
FIG. 6 schematically illustrates a basic approach concerning the independent and possible positions of each threaded valve pins during operation.
Figure 7:
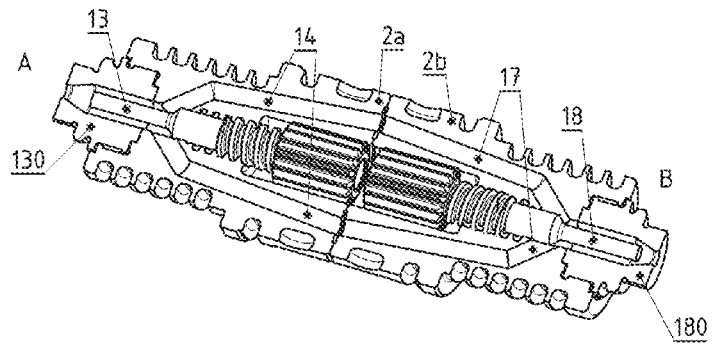
FIG. 7 illustrates a detailed 3D cross sectional view of two threaded valve pins referring to the rules and conditions during different phases of operation.
Figure 7:
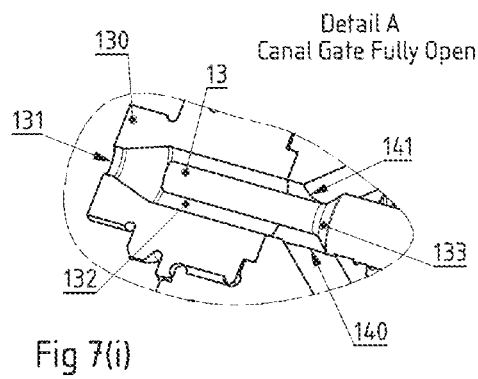
Figure 7:
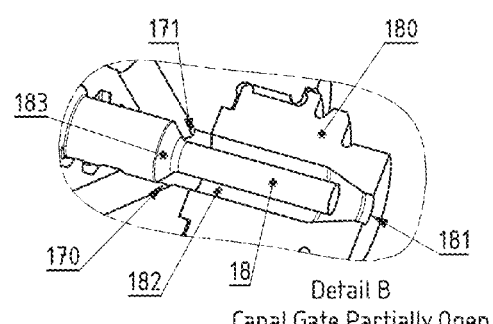
Figure 7:
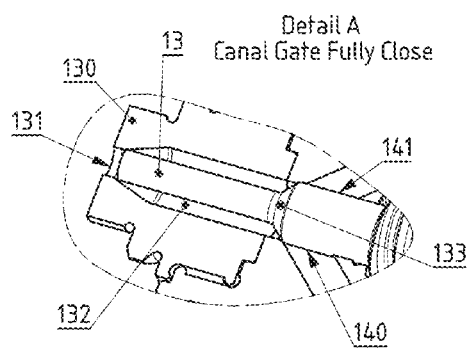
Figure 7:
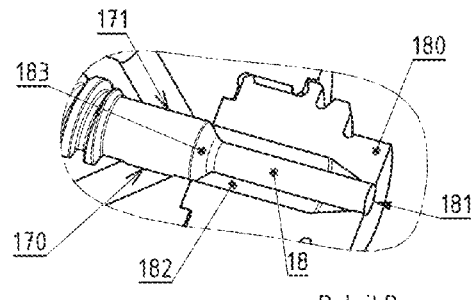
Figure 8:
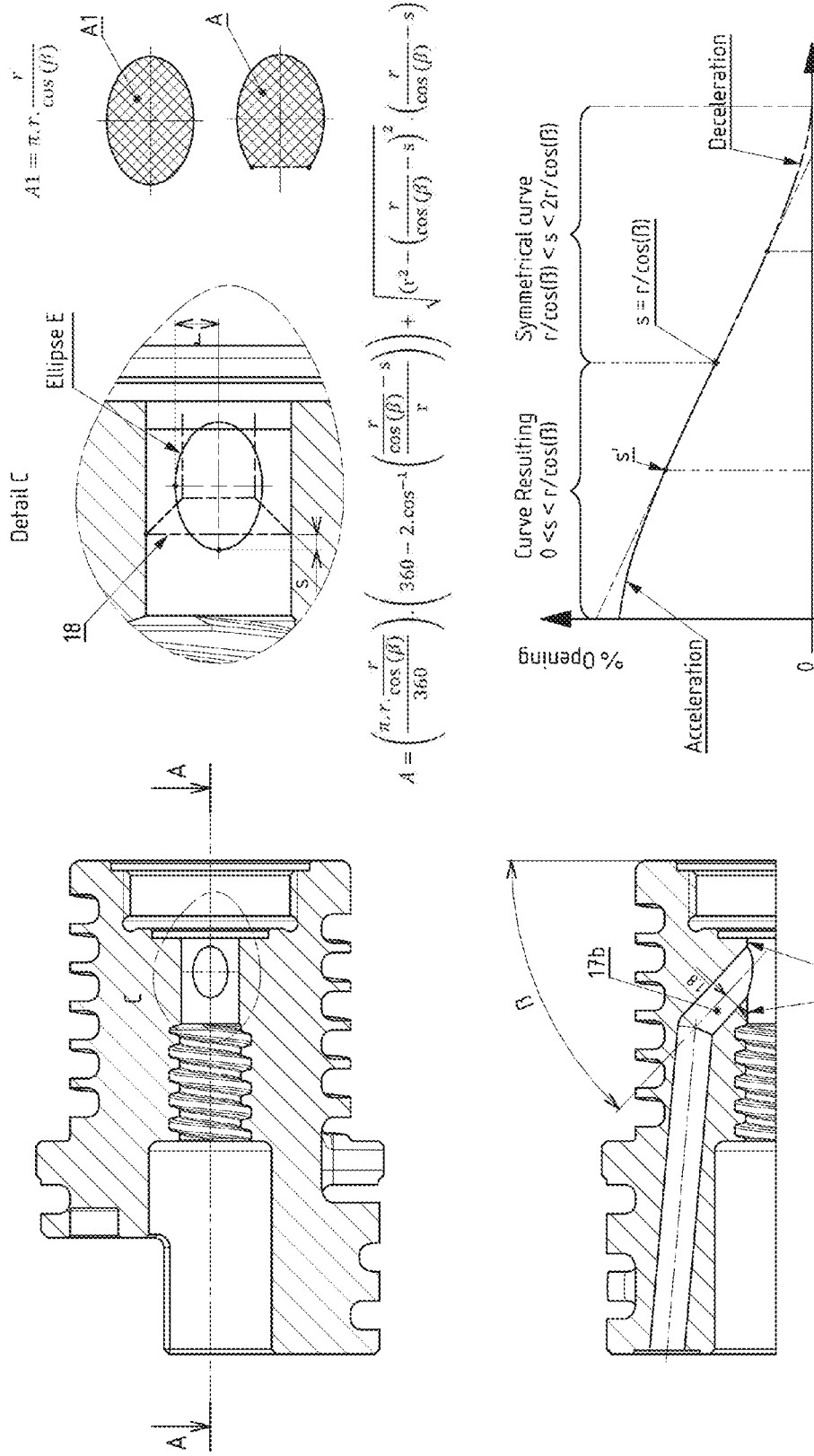
FIG. 8 illustrates the mechanical aspect of the sizes of the gate, which are derived from a simplified equation.

FIGS. 6 to 8 are referring to the accurate control and movement required by the threaded valve pin system and are illustrating the mechanical as well as the mathematical aspect of the invention.

Figure 9:
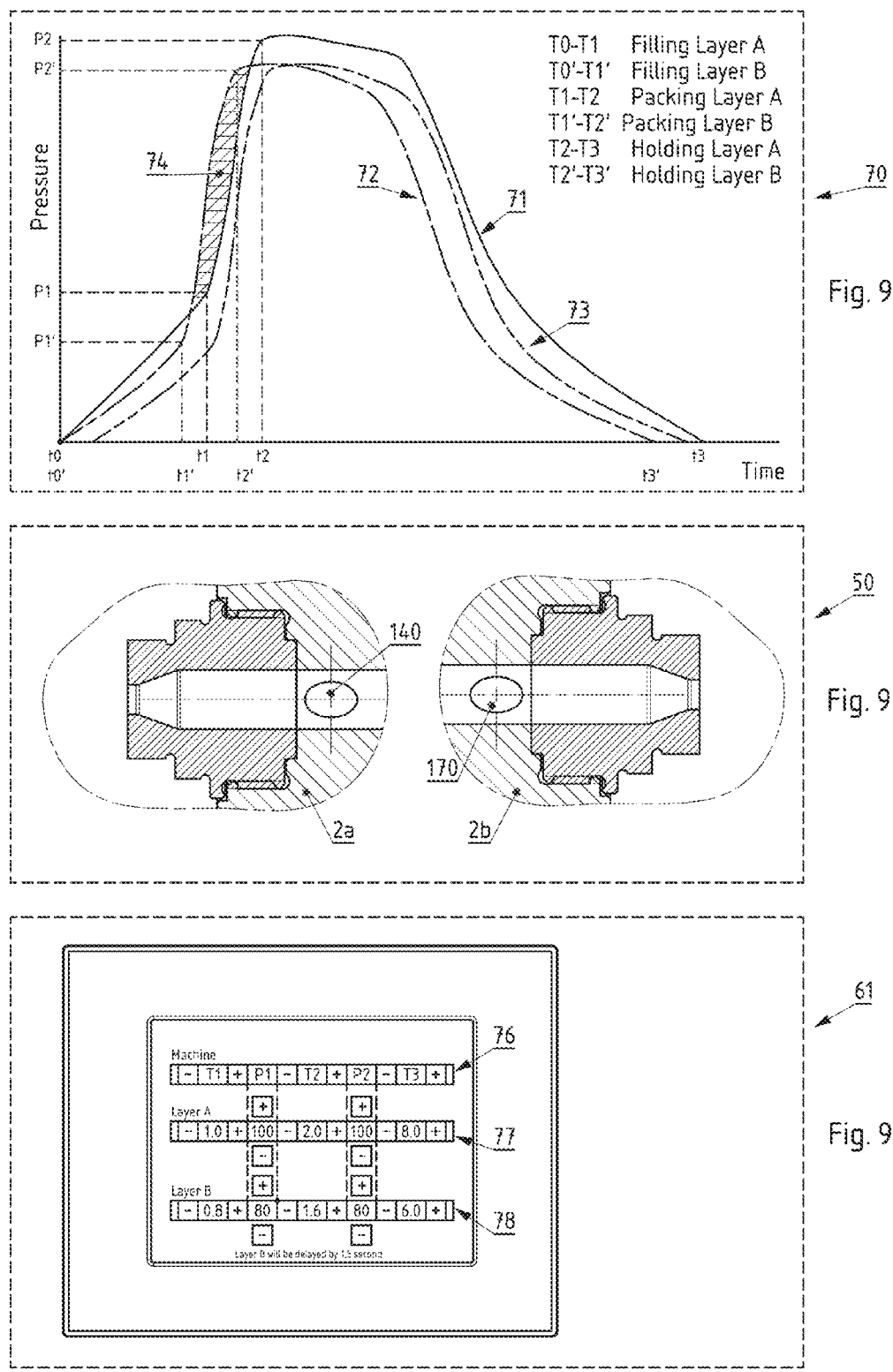
FIG. 9 shows how the successive waveforms given by the injection-molding machine will affect the final user interface in the independent tool controller.

FIG. 9 integrates the final step of the development stipulating the fundamental relationship between a conventional injection machine and an independent tool controller via the minimum input, addressable by a novice operator. These data will be the only human intervention inside the process simplifying the control of the threaded valve pins.

Gears-Driven Only—Threaded Valve Pin Design

The present invention highlights the possible use of a combination of gears drive and stepper motors, which include a particular and internal type of worm gear that will simplify the connection between the worm gears and the threaded valve pin located inside the hot nozzle.

FIG. 1 schematically illustrates the partial section view of a simplified sequential tool 100 with the fixed half denoted as 40 and floating half as 50. This schematic view shows us a hot nozzle system with the hot nozzle 1 controlled by the stepper motor 3, and the back to back hot nozzle system 2 controlled by stepper motors 4*a* and 4*b*. Each stepper motor is powered separately by an Independent Tool Controller 60 in which the control panel necessary for the end user to input the data is denoted as 61. As illustrated in this FIG. 1, it will be important to note the homogeneity and simplicity of the system, given a full and independent control of each nozzle 1 and 2 without any relation with other components such as sensors or limit switches.

Figure 2:
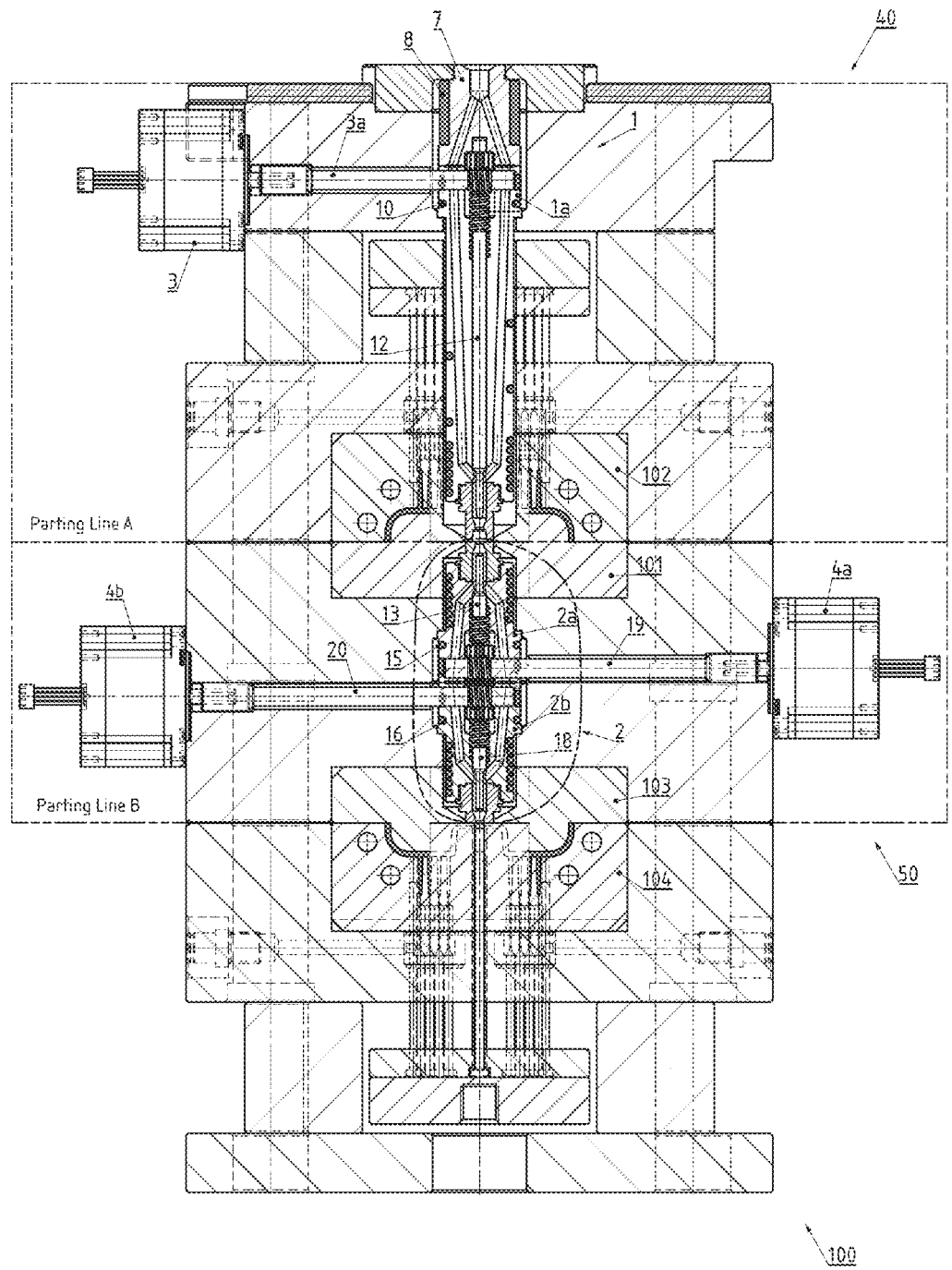
FIG. 2 schematically illustrates the integration of an internal threaded valve pin system in a cross-sectional view of a typical sequential tool including the worm gears, which are powered by stepper motors.

FIG. 2 schematically illustrates the detailed integration of the previously defined hot nozzle system 1 and 2 as well as its respective stepper motors 3, 4*a* and 4*b* inside the full section of a typical sequential tool 100. The parting line A is defined by its cavity 101 and core 102, and parting line B is defined by its cavity 103 and core 104. It is important to note that inside the fixed half side of the tool denoted as 40, nozzle 1 is elongated from the previous FIG. 1 depending of the design of tool. The independent heater 10 is coiled along the body 1*a* of the nozzle 1 and the separated pre-nozzle 7 warmed by its own heater 8. On the same fixed half side 40, we can see that the worm wheel 3*a* is powered by the stepper motor 3 in controlling the movement of the threaded valve pin 12, such that it will be able to open and close in order to control the flow and/or the pressure of molten plastic resin at the parting line A.

On the floating half side denoted as 50, we can see a detailed view of the back to back hot nozzle system 2 which comprises of the nozzle body 2*a* and 2*b* and their respective heaters 15 and 16. It is important to note that the actuator system comprised of the stepper motors 4*a* and 4*b* and the worm wheels 19 and 20, activating their respective threaded valve pins 13 and 18. This will in turn control the pressure and/or the flow of the molten plastic resin on the parting line B. Moreover in FIG. 2, it is important to note that the final assembly inside the tool is particularly simple. All the actuators system which consists of an externally-mounted motor and a worm gear could be easily dismantle for exchange or maintenance without any intervention on the tool itself. Similarly hot nozzles system defined as 1 and 2 could be easily dismantled from the tool without much difficulty.

FIG. 3*a* schematically illustrates a section view of the threaded valve pins' system in position inside a fixed half 40 with parting line A and floating half 50 with parting line B. During the initial injection phase of the plastic molding operation, molten plastic is being injected at the pre-nozzle 7 side at a pre-determined injection pressure, flow-rate and temperature flowing through the runner canal 9*a* with one input stream being split into two output streams 9*b* and 9*c*. The temperature of the molten plastic is being maintained via pre-heater 8 in the form of heater bands located around pre-nozzle 7. The pre-determined injection pressure varies depending on the type and configuration of the plastic part to be molded, as it will affect the dimensions, weight, sinks, voids, warpage and other part properties. Runner canal 9*b* and 9*c* is joined to runner canal 11*a* and 11*b* included inside the body 1*a* that is heated by its independent heater 10. On the fixed half side 40, the threaded valve pin 12 is in an open position with the molten plastic melt passing through along the nozzle and finishing its way at the center of the hot tip 120. At the extreme end of the threaded valve pin 12, we can see that both runners 11*a* and 11*b* converge inside the chamber 122. On the floating half side 50, it illustrates the hot tip 130 receiving the molten plastic melt from chamber 122 of the hot tip 120, with the molten plastic melt flowing along the extremity of the threaded valve pin 13 via the chamber 132 to the runner 14*a* and 14*b* included inside the nozzle body 2*a*. As illustrated in FIG. 3*a*, the runner canal 14*a* and 14*b* are split into two streams and are joined with the two streams denoted as runner canal 17*a* and 17*b* included inside the nozzle body 2*b*. The presence of the two threaded valve pins 13 and 18 is moving back-to-back to each other and can be independently controlled. This would mean that for a given injection shot using a fixed pre-determined injection pressure set from the barrel of the conventional injection machine, the user would be able to adjust such a pressure within the nozzle body 1*a* and nozzle bodies 2*a* and 2*b*. In doing so, the right amount of pressure could be applied onto parting line A and parting line B of the floating half of the mold. In other words, the proposed embodiment in the present invention is able to provide dynamic control for adjusting the injection parameters like flow-rate and pressure to mold complex and non-identical plastic parts. Molten plastic melt flowing along the two streams of runner canal 17a and 17b will then converge with the molten plastic melt mixing again inside the chamber 182 at the center of the hot tip 18. The temperature of the molten plastic is being maintained via heaters 15 and 16, which are coiled around the two (2) nozzle bodies 2a and 2b. The injection parameters to control such movement of the valve pins 13 and 18 would be pre-set at the independent tool controller 60 at the control panel area 61.

FIG. 4a schematically illustrates a new detailed cross section of the threaded valve pins 13 and 18, which highlights the mechanical aspect using a worm gear 22 between the worm wheel 19 and the gear 23 concerning the driving of the threaded valve pin 13 and another worm gear 25 between the worm wheel 20 and the gear 24 for the threaded valve pin 18. The two advantages of this gear system are, firstly, to drive both threaded valve pins 13 and 18 independently and secondly, to create the primary step of the final torque necessary to finely adjust the potential power and accuracy requested by the system. The ratios between the gears will transmit the power and accuracy, associated with a comfortable speed giving a final smooth translated movement developed by the rotation of threaded valve pins 13 and 18 around their threaded section 26 and 28, which will actuate the stroke A and stroke B denoted as 29 and 30 respectively. These threads 26 and 28 will allow a large tolerance of about 50μ to compensate for any dimensional imperfections during machining and mismatching resulting from the thermal expansion during the heating phase of the nozzle. This extra tolerance will be compensated by a minimum tolerance on the circular areas 21 and 27 corresponding to the effective area of sealing, fixing a possible back flow or drooling of the molten plastic resin. It has to be noted that the importance of limiting the pressure loss due to the back flow phenomenon has already been mentioned previously under the "Background of the Invention" portion.

FIG. 5a illustrates a perspective view of how the worm drive actuating mechanism featuring the worm gears 22, 25 and worm wheels 19, 20 that interacts with the two threaded valve pins 13, 18 respectively. As shown in the previous Figures, the movement of the worm wheels 19, are powered by stepper motors 4a and 4b, whereby the turning of the worm wheels 19, 20 will in turn rotate the worm gears 22, 25 via the interconnecting "threaded teeth", which in turn will rotate the valve pin 13, 18 via the gears 23, 24. This process will in turn regulate and control the movement of the valve pins 13 and 18 respectively, thus preventing the molten plastic from drooling out when the valve pin is fully closed with the help of circular sealing areas 21 and 27 as shown in FIG. 4a. It will be interesting to note for FIGS. 4a and 5 that the worm gears 22 and 25 uses a particular teeth design. Hence this provides the component with the possibility to mesh with both gears 23 and 24 to be properly linked to the threaded valve pin 13 and 18, as well as to engage directly with the worm wheels 19 and 20 without the need for extra gear as seen in other applications. This particular profile of teeth by the disclosed present invention provides the possibility to be viable under this threaded form. Other similar applications would require extra space, adding some restriction in term of the final size of the nozzle end, thereby affecting the ability to match with any standard parts.

FIG. 6 schematically illustrates a basic approach concerning the independent and possible positions of each threaded valve pins during operation. Firstly, FIG. 6 introduces two different situations shown in FIG. 6(i) and FIG. 6(ii), concerning a hot nozzle back-to-back system, in which both situations are not referring to any particular operating sequence such as step 1, step 2, etc but only to two random examples to illustrate two possible positions during a full process. Assuming that both nozzle bodies 2a and 2b are fully open as shown in FIG. 6(i), and that the molten plastic resin flows into the input 5a, it can be affirmed that the pressure and flow-rate introduced will be equivalent at the other end of the nozzle 6a. This affirmation will be true if we consider that the temperature of the molten plastic resin will be maintain constant throughout the nozzle body 2a and 2b and that the slight loss in the pressure due to the friction on the surface could be considered as null. The last point will be to stipulate that the area of the resin canal will be constant at any point of this canal in order to remove any possible pressure drop associated to a narrow passage.

However if we are considering the illustration shown in FIG. 6(ii), since parting line A is the first parting line of the mold in a typical sequential mold, the threaded valve pin 13 at nozzle body 2a will be closing slowly at gate A, from a fully open position to a fully closed position. Hence, at this moment with the input of the molten plastic resin at gate A fully closed, the pressure within the nozzle body 2a and 2b will no longer be relative to the pressure from the injection barrel of a conventional injection molding machine. Instead, the pressure within the nozzle body 2a and 2b will be associated with the pressure within the internal canal of the nozzle body 2a and 2b. At this point of time, there will be pressure drop across the length of the resin canal inside the nozzle body 2a and 2b. At the same time, the threaded valve pin 18 at nozzle body 2b can be partially open or close to regulate the flow of molten plastic melt. Hence, this shows that the movement of the two threaded valve pins are independently controlled of each other by the independent tool controller 60 even though both of them are moving in a back-to-back direction. The output flow-rate of the molten plastic melt will be relative to the size of the opening at gate B. Therefore, through the use of the independent back-to-back valve pins within the nozzle on the floating half of the mold, it will be clear that when gate A is re-open, gate B will at this moment be subjected to maximum pressure with the flow-rate being variable, by adjusting the position of the threaded valve pin 18.

Thus, the phenomenon described in the preceding paragraph for FIG. 6 follows the Bernoulli's Principle concerning flow-rate and pressure for an incompressible fluid. This would also mean that a high flow-rate required at the output 6b would in turn require a high-pressure at the input 5b. This is especially so in a sequential mold whereby sufficient pressure and flow-rate would be needed to mold out a good high-quality product at the parting line B of the mold. Hence, if the valve pin 13 at nozzle A is closed, the pressure at gate A could be moderated to enable a sufficient flow of molten plastic melt into the parting line B. Therefore, with an adjustable back-to-back valve pin 18, the pressure and flow-rate of the molten plastic can then be adjusted with either partial or full opening or closing of the valve pins 13 and 18 independently, to achieve good quality parts at parting line B.

FIG. 7 illustrates a detailed 3D cross sectional view of an assembly of two back-to-back internal valve gate nozzles, including the nozzle body denoted as 2a and 2b respectively, the valve pins 13 and 18, and also both hot tips 130 and 180.

In addition, resulting from the 3D cross section, we can see the half diameters of the resin canal 14 and 17 aligning back to back and terminating at both hot tips 130 and 180.

FIG. 7(*i*) illustrates a partial close up view of the nozzle body 2a including the canal gate 140 and 141, the hot tip 130, which comprise of the chamber 132 and the final gate 131. On this view, we can illustrate the fully open position of the valve pin 13, where both canal gates 140 and 141 leave the molten plastic resin free to flow. The rule of the surface 133 is particularly important, of course the wear resulting from the flow of the resin can be limited by using a coating on the surface of the valve pins, but a smart design of the chamfer will improve the flow of the resin, decreasing the shear stress subsequently at the sensitive resin flow channel areas.

FIG. 7(*ii*) shows us the second nozzle body 2b, the valve pin 18 and the hot tip 180 comprising of chamber 182 and the final gate 181. This time, we can illustrate that both canal gate 170 and 171 are partially close while it will be important to note the position of the valve pin 18 still keeping the final gate 181 fully open. The rule of the valve pin 18 during all the closing action is in fact particularly important; any post-constraint inside the chamber 182 will modify the final flow, with possible bending effect and breakage. The correct way, will be to let the molten plastic resin free to flow at final gate 181 until the full closing of the canal gates 170 and 171.

FIG. 7(*iii*) shows us an important moment concerning the position of the valve pin 13. In this position, the valve pin 13 has fully sealed both canal gate 140 and 141, with the final gate 131 still not fully closed. This action provides the possibility of stabilizing the pressure in the chamber 132, releasing molten plastic resin of any possible gas before the final closing. In fact, this crucial stage is known to be destructive for the molten resin, burning and gassing the remaining resin shot, hence it is advisable to condition the waiting shot to the above situation. This rule is done by the valve pin 13 during the waiting phase preceding the next shot, which is particularly long for a sequential tool. Another rule of the valve pin 13 will be to slightly pack the final gate 131, giving a better cosmetic effect if needed, removing flashes and leaving the product easy to release during the ejection phase.

FIG. 7(*iv*) shows us the final position of the valve pin 18 closing nicely on the final gate 181 as describe in the previous paragraph.

FIG. 8 illustrates the mechanical aspect of the sizes of the gate, which are derived from a simplified equation. In order to know the value of the flow-rate flowing through the resin canal based on a certain input value, it is necessary to determine the percentage of opening of the resin canal hole resulting from the movement of the threaded valve pin. Firstly, FIG. 8 illustrates a full section of the body of a typical back-to-back hot nozzle, and as we can see on the close up Detail C, the result of the intersection between the inclined runner canal 17b and the circular area 27 gives an ovoid curve. For a question of simplicity, this ovoid curve will be considered as an Ellipse E and by the way, the calculation of its full area represented as A1 will be defined as follow:

$$A1 = \pi \cdot r \cdot \frac{r}{\cos(\beta)}$$

On the same Detail C we can see in a dotted representation of a threaded valve pin 18 and the resulting intersection between the dotted representation and the previously described Ellipse E. It is clear that the final area A could be now defined using three essential parameters that is the radius of the hole "r", the stroke or movement of the pin "s", and the angle of the hole "β". Following these parameters the formula of the area A could be derived as follow:

$$A = \left(\frac{\pi \cdot r \cdot \frac{r}{\cos(\beta)}}{360}\right) \cdot \left(360 - 2 \cdot \cos^{-1}\left(\frac{\frac{r}{\cos(\beta)} - s}{r}\right)\right) + \sqrt{\left(r^2 - \left(\frac{r}{\cos(\beta)} - s\right)^2\right)} \cdot \left(\frac{r}{\cos(\beta)} - s\right)$$

Hence, the flow-rate of the molten plastic melt is defined as:

Flow Rate=π·r²··V

Where "r" is the radius of the final hole and "V" is flow velocity. If we consider the velocity as constant, it will be easy to understand that the Flow Rate will depend directly on the area of the resin canal. However if the resin canal is totally opened, the flow-rate would be 100% and if the resin canal was totally closed the flow-rate would be 0%.

As shown in the formula in FIG. 8, the surface area A will vary based on the stroke of the corresponding valve pin. A graphical curve E can be plotted showing the relationship between the percentage of opening related to flow rate and pressure of the resin canal hole with the stroke of the valve pin "s". As illustrated from the curve E in FIG. 8, when there is no movement in the valve pin, i.e. s=0, the resin canal hole is 100% fully opened. As the valve pin moves, its stroke "s" increases. Hence the percentage of opening of the resin canal hole that is associated with the flow and/or pressure will show a slight decrease from 0 to s' initially as shown in curve E followed by a rapid accelerated drop from s' to s. This rapid accelerated drop in the curve E will continue until the moment where the amount of stroke of the valve pin "s" is equal to r/cos(β). Subsequently when s>r/cos(β), the percentage of opening of the resin canal hole will continue to decrease, but with a curve proportionally opposite to the previously described curve due to the symmetrical nature of the Ellipse E. Therefore it can be deduced that the flow-rate and/or pressure will decrease following a curve corresponding to the acceleration and deceleration if the speed of the valve pin was linear. This acceleration and deceleration is important as it helps to reduce the shear stress of the molten plastic material, hence improving the quality of the molded plastic part. It is also apparent that the speed of the valve pin could be controlled gradually during its movement from a fully open start to a fully close end.

FIG. 9 shows how the successive waveforms given by a standard conventional injection-molding machine will affect the final user interface in the independent tool controller.

FIG. 9(*i*) shows a graphical plot 70 taken from a standard conventional injection-molding machine, with the plot illustrating the injection pressure versus time for the filling, packing and holding phase of a typical injection molding cycle on a two parting line sequential mold. The curve 71 illustrates the molding cycle during a pre-sequence using only the parting line A of the sequential mold, whereby the injection pressure at parting line A is essentially the same as the injection pressure from the barrel of the conventional injection-molding machine. It also means that curve 71 represents the desired machine settings for the plastic part to be molded. The curve 72 illustrates the molding cycle during a pre-sequence using only the parting line B of the sequential mold. As shown on FIG. 9(*i*), the overall injection pressure for parting line A is higher than the parting line B. This is attributed to the pressure drop or loss when the molten plastic flows from parting line A to the parting line B for a given amount of time. Assuming that the injection shot at the parting line B was equivalent to that of parting line A, this would mean that the compression or packing at parting line B would happen later than at parting line A. As a result, the overall curve for parting line B would shift slightly to the left and outside the desired machine settings needed for the molded plastic product. However, as illustrated on curve 72, this is not the case, and the packing of the parting line B happened earlier than the packing at parting line A.

Hence, this would present to us a particular difficult situation, whereby the shot in the parting line B is smaller than the parting line A. This particular situation demonstrated how the most complicated situation could be effectively solved by the present invention without any human or sensor intervention but only by a simple analysis followed by a logic calculation done by an independent tool controller 60.

Firstly, the independent controller 60 will analyse the situation based on the curve 71 and 72, and will detect if there is an overflow from the parting line B with respect to the parting line A, with the overflow represented by the area 74. Then, if this is the case, the independent tool controller 60 will calculate and execute the necessary shifting in order to remove this overflow. Hence for this case, the shift in the curve 72 to within the desired molding parameters as represented under curve 71 would be compensated by a delay in the molding time, for example by 1.5 seconds, as represented under numeral 79 within FIG. 9(*iii*). The shifted curve would then be represented as curve 73 in FIG. 9(*i*). Any deviations would then be corrected via signals sent out from the independent tool controller 60 connected to both stepper motors 4*a* and 4*b*, which powered the two valve pins via worm gears/worm wheel configuration.

Based on the corrected signals sent from the independent tool controller 60, the movement of the two valve pins within nozzle bodies 2*a* and 2*b* would then be able to adjust the flow-rate or pressure at parting line A and B independently. FIG. 9(*ii*) highlights the cross-sectional view for nozzle bodies 2*a* and 2*b* with the cross-sectional view for the resin canal for nozzle bodies 2*a* and 2*b* represented by numeral 140 and 170 respectively. As described in the previous paragraphs, the independent movement of the valve pins in nozzle bodies 2*a* and 2*b* would mean that numerals 140 and 170 could each represent adjustment of flow-rate within the flow canal or adjustment of pressure respectively, or vice versa.

FIG. 9(*iii*) shows a snapshot of how the molding parameters can be controlled via the user interface on the control panel 61 of the independent tool controller 60. For a given plastic part to be molded using a two parting line sequential mold, the desired machine settings to mold such a plastic part is shown on the top layer of the user interface control panel 61 under "machine", represented as numeral 76. Within the user interface 61, the parameters for molding the parting line A and the parting line B are represented as numeral 77 and 78 respectively.

Conclusion:

In most cases, the control of the flow rate of the molten plastic melt is usually managed completely by the operator of the injection molding process, aided by visual control of the plastic part. As described in the previous Figures, no sensor is needed for the present invention disclosed here.

The actuating mechanism to drive the valve pins is via worm gears with the worm wheels connected to stepper motors. Since there is no sensor needed for this present invention, the stepper motors connected to the worm wheels/worm gears to actuate the threaded valve pins will have to be accurate and fast enough in responding to any changes during the initial filling phase of the injection molding process. By making a quick calculation, it will be easy to see that the number of turns of the threaded valve pins between the opening position and the closing position is only 2.4 turns. A common stepper motor is actually able to run at 6000 rpm with a gearbox ratio of 10 in order to be able to develop an acceptable torque. If we divide these 6000 turns by 10 and by 60 seconds, we can see that valve pin could make 2.4 turns in less than ¼ of second. If we associate this speed to a common motor with 0.0072 degrees per step, we can imagine that we will be very close to a real-time control based on a predefined curve.

For a dynamic control, this would mean that under certain molding conditions that require precision control in the molding parameters like flow-rate, pressure, etc, the form of dynamic control proposed in the present invention would be able to have a faster response compared to using sensor. Similar to any electronic components, the sensor will typically have a tolerance approximately +/−5% whereas the dynamic form of control disclosed in the present invention is much more precise. Another point to note is that the response time for the sensor as well as the response time for the controller are both linked and hence the response time to adjust the parameters for the sensor might not be as rapid especially at a particular short notice. Besides, over long usage of the use of sensors, there could potentially be some leakage problem associated with the use of sensors. Coupled with the fact that the sensors will be subjected to heavy-usage (e.g. high temperature, dirt, etc.), it might contribute to lower efficiency in the use of the sensor over long period.

Hence to conclude, the objective of the embodiment disclosed in the present invention serves to adjust the flow-rate and pressure during the filling time so as to have precise and adjustable control of the molten plastic when molding at least two non-identical (i.e. with more than 50% difference in weight or form) complex-shaped plastic parts. For most of the other designs in the prior art, the flow-rate control for the process is limited to a static action based on a pre-defined opening and closing linked to a sensor given in order to close the valve gate. For the current embodiment in the present invention, the control of flow-rate and pressure will be fully dynamic (i.e. without the need of sensor) and is invariably linked to the profile of the curve calculated from the movement of valve pins with respect to the area of the resin canal hole as illustrated previously. The dynamic control is aided by the use of valve gates linked to stepper motors (or servo or linear motors) to control the speed and accuracy necessary to meet the specifications required in molding the required plastic part during the initial filling phase of the injection molding process.

Slider-Driven Only—Non-Threaded Valve Pin Design

The present invention highlights the possible use of a combination of angular pin/slider mechanism and stepper motors, which include an internal angular pin and slider that will connect between the gears drive and the non-threaded valve pin located inside the hot nozzle.

FIG. 3*b* schematically illustrates a section view of the non-threaded valve pins' system consisting of non-threaded valve pin 112 position inside a fixed half 40 with parting line A and non-threaded valve pin 113 and 118 position inside floating half 50 with parting line B. Essentially, the operation and functions of the non-threaded valve pin system as shown in FIG. 3b is exactly similar to that of FIG. 3a, with the components within the nozzle system 1a, 2a and 2b being similar as well. As mentioned previously, the description of one similar part also applies by reference to another similar part, where appropriate, thereby reducing repetition of text without limiting the disclosure.

FIG. 4b schematically illustrates a new detailed cross-section of the non-threaded valve pins 113 and 118, which highlights the mechanical aspect using an angular pin 128 powered by gear drive 119 concerning the driving of the non-threaded valve pin 113 via slider 123. FIG. 4b also highlights the mechanical aspect using an angular pin 126 powered by gear drive 120 concerning the driving of the non-threaded valve pin 118 via slider 124. Similar in function to the threaded valve pins as per described previously, the two advantages of this gear system are, firstly, to drive both non-threaded valve pins 113 and 118 independently and secondly, to create the primary step of the final torque necessary to finely adjust the potential power and accuracy requested by the system. As illustrated in FIG. 4b, the angular pin mechanism denoted as 128 and 126, has a wedge at one end with a small angle that transverses with the slider 123 and 124, such that a small angle inclination of less than 45 degrees can translate a smaller pressure from the body of the angular pin 128 and 126 into a larger pressure to push the slider 123 and 124 respectively. Due to the relationship "energy=force times distance", a larger distance of the angular pin mechanism is also translated into a small distance of the slider 123 and 124. Hence such a configuration allows the angular pin movement to provide greater accuracy when adjusting the movement of valve pins 113 and 118. The configuration of the gear drive 119 and 120 with the angular pin 128 and 126 respectively will be such that the right amount of torque produced by the gears will in turn be able to actuate the slider 123 and 124 to drive the non-threaded valve pin 113 and 118 respectively. The angle of the angular pin 128 and 126 together with the torque produced by the gear drive 119 and 120 will in turn provide a final smooth translated movement developed by the rotation of non-threaded valve pins 113 and 118, thereby actuating the stroke A and stroke B denoted as 29 and 30 respectively. Such movement will also fix a possible back flow or drooling of the molten plastic resin by effectively sealing at areas 21 and 27. Similarly, it has to be noted that the importance of limiting the pressure loss due to the back flow phenomenon has already been mentioned previously under the "Background of the Invention" portion.

FIG. 5b illustrates a perspective view of how the slider-driven actuating mechanism featuring the gear drives 119 and 120 intersecting with angular pin 128 and 126 respectively in order to actuate the slider 123 and 124 respectively so that it drives the movement of the two non-threaded valve pins 113 and 118 respectively. For the present invention, the movement of the gear drives 119 and 120 are powered by stepper motors 4a and 4b. The stepper motors 4a and 4b enables the turning of the gear drives 119 and 120, which will in turn actuate the angular pin 128 and 126 respectively via the interconnecting "threaded teeth". As mentioned previously in the write-up for FIG. 4b, the angular pin mechanism denoted as 128 and 126 has a wedge at one end with a small angle that transverses with the slider 123 and 124. A small angle inclination of less than 45 degrees for the wedge at angular pin 128 and 126 respectively can translate a smaller pressure from the body of the angular pin 128 and 126 into a larger pressure to push the slider 123 and 124 respectively. This slider movement will then enable the movement for the non-threaded valve pins 113 and 118 to fully and/or partially open/close, depending on the injection molding parameters. This process will in turn regulate and control the movement of the valve pins 113 and 118 respectively, thus preventing the molten plastic from drooling out when the valve pin is fully closed with the help circular sealing areas 21 and 27 as shown in FIG. 4b. It will be interesting to note for FIGS. 4b and 5b that the angular pins 128 and 126 uses a particular teeth design. Hence this provides the component with the possibility to mesh with both gears 119 and 120 such that movement of the gear 119 and 120 will provide a smooth translated movement of the non-threaded valve pin 113 and 118 respectively.

It is to be understood that the foregoing description of the preferred embodiment is intended to be purely illustrative of the principles of the invention, rather than exhaustive thereof, and that changes and variations will be apparent to those skilled in the art, and that the present invention is not intended to be limited other than as expressly set forth in the following claims.

What is claimed is:

1. An improved hot runner injection molding apparatus for an injection molding tool for molding out at least two non-identical or identical complex-shaped and intricate plastic parts, comprising of:

an independent, external self-contained control unit, wherein the control unit comprises ports to drive at least one motor device, and the at least one motor device powers at least a pair of worm wheel and worm gear which is connected to at least one of a plurality of threaded valve pins for a corresponding nozzle system within said injection molding tool for receiving the melt flow from said injection molding tool, said injection molding tool having a mold plate having a fixed half and a floating half, with the nozzle system comprising a primary nozzle system and a secondary nozzle system with heater bands coiled around each nozzle, whereby the primary nozzle system with built-in resin canal is positioned at the fixed half of the mold plate, and the secondary nozzle system with built-in resin canal is positioned at the floating half of the mold plate, all of said plurality of threaded valve pins housed within a nozzle system wherein one of said threaded valve pins is housed within the primary nozzle system and at least two of said threaded valve pins are housed within the secondary nozzle system, wherein the plurality of valve pins are threaded with valve gears, wherein for each of said plurality of threaded valve pins, a worm gear is located between a worm wheel and a valve gear, and whereby there is a sealing gate on a portion of each of the plurality of threaded valve pins located within the primary and secondary nozzle systems, wherein the movements of each of said plurality of threaded valve pins are configured such that their movements are actuated by a combination of the worm gear and worm wheel whereby the worm gear that drives each of said plurality of threaded valve pins is rotated by a corresponding movement of the intersecting worm wheel driven by the motor device, wherein the movement of each of the plurality of threaded valve pins inside the nozzles are such that when the plurality of threaded valve pins is in a fully open position, plastic injection occurs and molten plastic is allow to flow through the nozzles via the resin canal and there is no rotation of the valve gear with the corresponding worm wheel and the intersecting worm gear, OR when the plurality of threaded valve pin is approaching to fully closed position when the plurality of threaded valve pin is approaching the tip of the nozzle gate via its rotation movement which is actuated by the rotation of the valve gear with the corresponding worm wheel and the intersecting worm gear, OR when the plurality of threaded valve pin is at a partial open or closed position via its rotation movement which is actuated by the rotation of the valve gear with the corresponding worm wheel and intersecting worm gear.

2. The improved hot runner injection molding system according to claim 1 wherein the said injection molding tool contains at least two or more cavities corresponding to the shape and dimension of the product to be molded; wherein the injection molding tool comprises at least a front fixed part, a central moveable part, and a rear part which are moveable in relation to each other; and at least two parting layers, with the first parting layer extending between the front fixed part of tool and the moveable part of the tool, and the second parting layer extending between the moveable part of the tool and the rear part of the tool.

3. The improved hot runner injection molding system according to claim 2 wherein the said open and closed positions relative to each other in a pre-determined sequence is applicable for sequential, stack and/or multi-layer molds.

4. The improved hot runner injection molding system according to claim 1 wherein the movement of the plurality of threaded valve pins within the secondary nozzle are independent of each other and in a pre-determined sequence.

5. The improved hot runner injection molding system according to claim 1 wherein the motor device to actuate the rotation of the worm wheel is a stepper motor.

6. The improved hot runner injection molding system according to claim 1 wherein the motor device to actuate the rotation of the worm wheel is a servo motor.

7. The improved hot runner injection molding system according to claim 1 wherein the motor device to actuate the rotation of the worm wheel is a linear motor.

8. The improved hot runner injection molding system according to claim 1 wherein the worm gear is located internally within the nozzle of a sequential, stack and/or multi-layer cavity mold in said injection molding machine.

9. An improved hot runner injection molding apparatus for an injection molding tool for molding out at least two non-identical or identical complex-shaped and intricate plastic parts, comprising:

an independent, external self-contained control unit, wherein the control unit comprises ports to drive at least one motor device, and the at least one motor device powers a gear system which intersects with the threaded portion of an angular pin and gear teeth, said angular pin has a wedge at one end thereof that transverses with at least one slider mechanism for a corresponding non-threaded valve pin within a nozzle system of an injection molding tool for receiving the melt flow from said injection molding tool, said injection molding tool having a mold plate having a fixed half and a floating half, with the nozzle system comprising a primary nozzle system and a secondary nozzle system with heater bands coiled around each nozzle, wherein the primary nozzle system with built-in resin canal is positioned at the fixed half of the mold plate, and the secondary nozzle system with built-in resin canal is positioned at the floating half of the mold plate, wherein said non-threaded valve pin is housed within a nozzle system, wherein the non-threaded valve pin is housed within the primary nozzle system and at least two non-threaded valve pins are housed within the secondary nozzle system, wherein there is a sealing gate on a portion of said non-threaded valve pin and the at least two non-threaded valve pins located within the primary and secondary nozzle systems, wherein the movements of said non-threaded valve pin and the at least two non-threaded valve pins are configured such that their movements are actuated by the rotation of the gear system each driven by one of said at least one motor device, which in turn actuates the angular pins to enable the slider mechanisms to slide, thus actuating the corresponding said non-threaded valve pin and the at least two non-threaded valve pins to move, wherein the movement of the said non-threaded valve pin and the at least two non-threaded valve pins inside the nozzles are such that when the non-threaded valve pin is in a fully open position, plastic injection occurs and molten plastic is allow to flow through the nozzles via the resin canal and there is no movement of the angular pin with the corresponding slider mechanism, OR when the non-threaded valve pin is approaching to fully closed position when the non-threaded valve pin is approaching the tip of the nozzle gate via the movement of the angular pin with the corresponding slider mechanism, OR when the non-threaded valve pin is at a partial open or closed position via the movement of the angular pin with the corresponding slider mechanism.

10. The improved hot runner injection molding system according to claim 9 wherein the said injection molding tool contains at least two or more cavities corresponding to the shape and dimension of the product to be molded; wherein the injection molding tool comprises at least a front fixed part, a central moveable part and a rear part which are moveable in relation to each other; and at least two parting layers, with the first parting layer extending between the front fixed part of the tool and the moveable part of the tool, the second parting layer extending between the moveable part of the tool and the rear part of the tool.

11. The improved hot runner injection molding system according to claim 10 wherein the said open and closed positions relative to each other in a pre-determined sequence is applicable for sequential, stack and/or multi-layer molds.

12. The improved hot runner injection molding system according to claim 9 wherein the movements of the said non-threaded valve pin and the at least two non-threaded valve pins within the floating half of the mold are independent of each other and in a pre-determined sequence.

13. The improved hot runner injection molding system according to claim 9 wherein the at least one motor device to actuate the rotation of the gear system is a stepper motor.

14. The improved hot runner injection molding system according to claim 9 wherein the at least one motor device to actuate the rotation of the gear system is a servo motor.

15. The improved hot runner injection molding system according to claim 9 wherein the at least one motor device to actuate the rotation of the gear system is a linear motor.

* * * * *